June 4, 1957 W. SHOCKLEY 2,794,917
HIGH FREQUENCY NEGATIVE RESISTANCE DEVICE
Filed Jan. 27, 1953 12 Sheets-Sheet 1

INVENTOR
W. SHOCKLEY
BY David H. Wilson, Jr.
ATTORNEY

June 4, 1957  W. SHOCKLEY  2,794,917
HIGH FREQUENCY NEGATIVE RESISTANCE DEVICE
Filed Jan. 27, 1953  12 Sheets-Sheet 2

INVENTOR
W. SHOCKLEY
BY David H. Wilson, Jr.
ATTORNEY

June 4, 1957 W. SHOCKLEY 2,794,917
HIGH FREQUENCY NEGATIVE RESISTANCE DEVICE
Filed Jan. 27, 1953

INVENTOR
W. SHOCKLEY
BY David H. Wilson, Jr.
ATTORNEY

June 4, 1957  W. SHOCKLEY  2,794,917
HIGH FREQUENCY NEGATIVE RESISTANCE DEVICE
Filed Jan. 27, 1953  12 Sheets-Sheet 4

INVENTOR
W. SHOCKLEY
BY David H. Wilson, Jr.
ATTORNEY

June 4, 1957  W. SHOCKLEY  2,794,917
HIGH FREQUENCY NEGATIVE RESISTANCE DEVICE
Filed Jan. 27, 1953  12 Sheets-Sheet 5
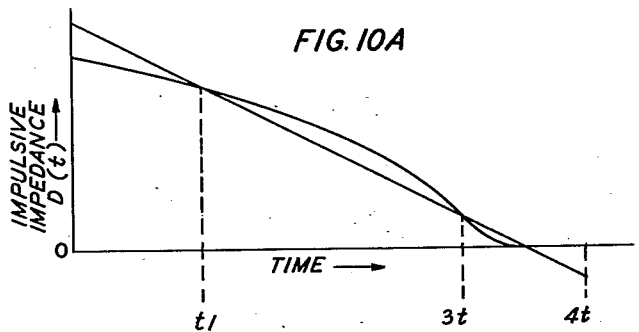
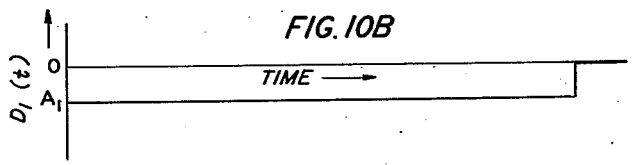
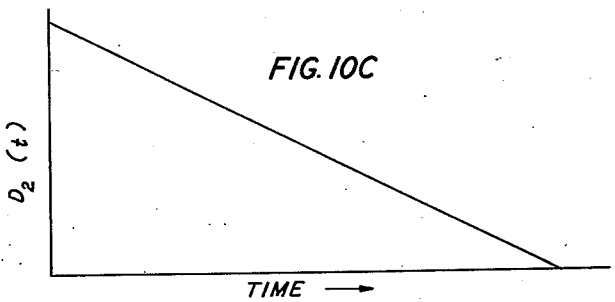
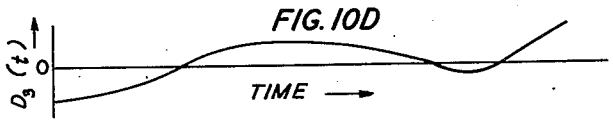
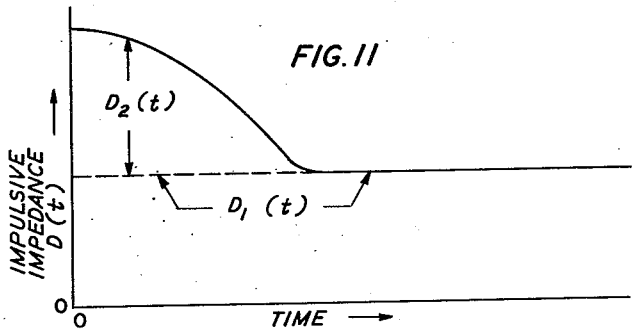
INVENTOR
W. SHOCKLEY
BY David H. Wilson, Jr.
ATTORNEY June 4, 1957  W. SHOCKLEY  2,794,917
HIGH FREQUENCY NEGATIVE RESISTANCE DEVICE
Filed Jan. 27, 1953  12 Sheets-Sheet 6

POTENTIAL OF A HOLE

STEADY STATE BIAS SPACE CHARGE OF HOLES

SPACE CHARGE OF HOLES DUE TO DENSITY OF DONORS AND ACCEPTORS

INVENTOR
W. SHOCKLEY
BY David H. Wilson, Jr.
ATTORNEY

June 4, 1957 W. SHOCKLEY 2,794,917
HIGH FREQUENCY NEGATIVE RESISTANCE DEVICE
Filed Jan. 27, 1953 12 Sheets-Sheet 7
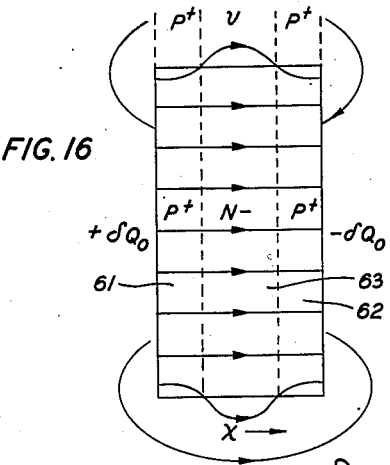
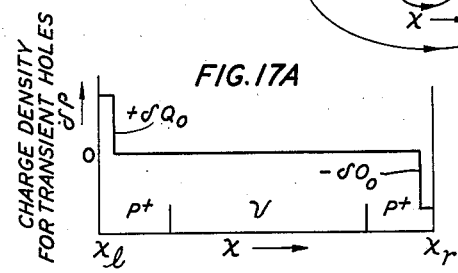
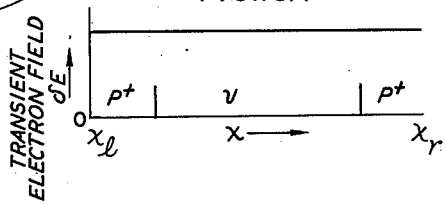
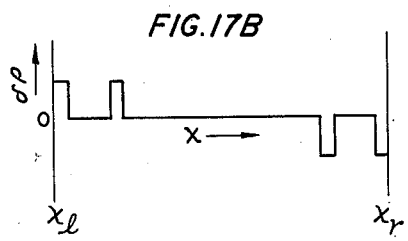
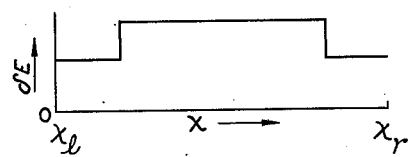
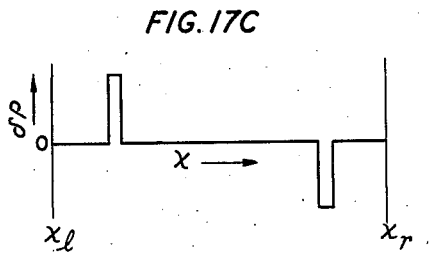
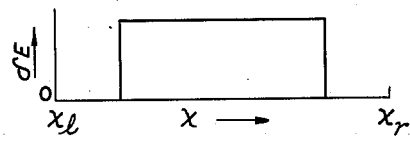
INVENTOR
W. SHOCKLEY
BY David H. Wilson, Jr.
ATTORNEY INVENTOR
W. SHOCKLEY
BY David H. Wilson, Jr.
ATTORNEY June 4, 1957 W. SHOCKLEY 2,794,917
HIGH FREQUENCY NEGATIVE RESISTANCE DEVICE
Filed Jan. 27, 1953 12 Sheets-Sheet 9

INVENTOR
*W. SHOCKLEY*
BY
*David H. Wilson, Jr.*
ATTORNEY

June 4, 1957 W. SHOCKLEY 2,794,917
HIGH FREQUENCY NEGATIVE RESISTANCE DEVICE
Filed Jan. 27, 1953 12 Sheets-Sheet 10

SPACE CHARGE OF TRANSIENT HOLES

INVENTOR
W. SHOCKLEY
BY David H. Wilson, Jr.
ATTORNEY

June 4, 1957  W. SHOCKLEY  2,794,917
HIGH FREQUENCY NEGATIVE RESISTANCE DEVICE
Filed Jan. 27, 1953  12 Sheets-Sheet 12

CHARGE DENSITY OF TRANSIENT HOLES

TRANSIENT FIELD

INPULSIVE IMPEDANCE

TIME →

INVENTOR
W. SHOCKLEY
BY David H. Wilson, Jr.
ATTORNEY

2,794,917

United States Patent Office

Patented June 4, 1957

2,794,917

HIGH FREQUENCY NEGATIVE RESISTANCE DEVICE

William Shockley, Madison, N. J., assignor to Bell Telephone Laboratories, Incorporated, New York, N. Y., a corporation of New York Application January 27, 1953, Serial No. 333,449

40 Claims. (Cl. 250—36)

This application is a continuation in part of application Serial No. 91,594, filed May 5, 1949, now Patent 2,681,993, which issued June 22, 1954, for Circuit Element Utilizing Semiconductive Materials, which is a division of a similarly entitled application Serial No. 35,423, filed June 26, 1948, now Patent 2,569,347, September 25, 1951.

This invention relates to semiconductive translators and more particularly, to such translators exhibiting negative power dissipation to alternating signals, applications for translators having such negative power dissipation, and methods of operating translators to obtain this negative power dissipation.

An object of the present invention is to improve means for and methods of translating electrical signals.

Another object is to improve semiconductive translators and their methods of operation whereby negative power dissipation at high frequencies is obtained.

A feature of this invention resides in controlling the current flowing through a semiconductive body by an electric field or fields of a nature different from those responsible for normal current flow through a body.

An additional feature pertains to obtaining negative signal power dissipation in a semiconductive device at high frequencies by transit time effects of charge carriers in the device. More particularly, negative resistance is developed in two terminal semiconductive elements by correlating the structural and operating parameters of the elements so that the period of the operating frequency and the transit time of charge carriers across a region are properly related. The negative signal power dissipation in these devices is the result of a shift in phase between the signal voltage and the signal current flowing through that portion of the device across which the principal voltage drop occurs.

Another feature involves utilizing a semiconductive body having a minority charge carrier injector, means for effecting a delay between the signal voltage and the flow of current due to injected minority charge carriers, and means for obtaining a high current subsequent to said delay whereby a phase shift is obtained between the signal voltage and current of such magnitude that negative signal power dissipation is realized. In other words, the pulsive signal charge traverses a region having a higher field gradient during the latter portion of its transit through the device than the gradient through which it passes during the initial portion of its transit.

A feature of some embodiments comprehends a geometry wherein the lines of flow of the charge carriers converge as they approach the collecting region of the device. In such a structure, the motion of charges toward the end of their path produces a larger change in voltage than for a comparable motion earlier in the path.

The utilization of a region in a semiconductive body in which there is substantially no field and the motion of the charge carriers occurs slowly by the process of diffusion intermediate the source of charge carriers and the region in which the major voltage drop occurs to produce a delay between voltage and current constitutes a feature of some embodiments of this invention.

A feature of some embodiments of this invention which are akin to those having the next preceding feature resides in utilizing a built in field in the delay region intermediate the charge carrier source and the region in which the major portion of the voltage drop occurs, thereby increasing the amount of negative signal power dissipation obtained.

A further feature involves so correlating the bias and signal frequency applied to a semiconductive body containing three adjacent zones of opposite conductivity types with the semiconductive characteristics of those zones and the width of the intermediate zone that the device exhibits negative resistance to the applied signal.

Other features include combinations in which negative resistance semiconductive diodes are correlated with other elements and control means for operation in amplifiers, oscillators, modulators, and other circuit arrangements.

The term negative resistance will be employed in this discussion to define a device which provides negative power dissipation of an alternating signal. Negative power dissipation of a signal is realized when the integrated product of the signal voltage and signal current is negative. One way of obtaining a negative integrated product of current and voltage is by establishing a phase shift between the voltage and current in the first or subsequent cycles of between 90 and 270 degrees. Devices wherein the transit time of charge carriers from an injector to a reverse biased barrier falls between one half and three halves the period of the applied signal will exhibit negative resistance to that signal.

Negative resistances are known in the art. Heretofore, semiconductive negative resistances generally have been of the type which operate by thermistor action. The resistance of these devices is inversely related to their temperature. This factor can be utilized to effect inversely related variations between current and voltage which occur at less than the critical frequency of the unit. An increase in current through them increases their power dissipation which, in turn, increases their temperature, thereby reducing their resistance and thus their voltage. Since it is essential to the operation of thermistor type negative resistances that their temperature follow the current which flows, these devices must be of low thermal inertia and therefore of small mass and good radiating capacity. Thermal inertia places limits on the maximum operating frequency, the power handling capacity and ruggedness of these devices.

J. A. Becker and M. C. Waltz have disclosed another form of semiconductive dynamic negative resistance in their application Serial No. 199,868, filed December 8, 1950, now Patent 2,740,940, issued April 3, 1956, wherein negative resistance operation is obtained by reducing the spreading resistance of the unit as the current flowing through it in the forward direction is increased.

Negative resistance in the present invention is realized by providing a phase shift between signal voltage and signal current in a manner somewhat related to that disclosed in F. B. Llewellyn's Reissue Patent 23,369, May 22, 1951. Llewellyn utilizes transit time effects in vacuum diodes and obtains circuit performance from them which is similar to that of the solid state transit time diodes of this invention. However, the mode of operation for semiconductive diodes differs markedly from that for vacuum diodes. This difference arises from the fact that in the case of vacuum devices the charge carriers, electrons, move with conservation of momentum so that the speed at any instant is dependent upon their past history. In contrast, electrons or holes in a semiconductor suffer collisions at a frequency of about $10^{12}$ times per second; as a result they continue to move in the direction of an applied field only so long as the field exerts a force upon them. It is possible to achieve negative resistance operation in semi-conductive devices even though the momentum of the charge carriers is not conserved by effecting the functions necessary for negative resistance in a manner and with means not available in vacuum diodes. Thus, a delay region in which motion of the charge carriers occurs slowly by diffusion is employed as one means of producing the necessary phase shift, fields are built into the structures chemically to enhance the acceleration of the charge carriers, and the "dielectric relaxation" at the operating voltages is decreased due to the non-linear relationship between drift velocity and electric field.

Generally the negative resistance units of this invention utilize semiconductive elements which from a functional standpoint are composed of three regions, namely a source of charge carirers, or a charge carrier injector, actuated by an applied signal voltage, a region through which travel of the carriers is delayed to obtain a phase shift between the current which they cause in the external circuit and the applied signal voltage, and a region through which the carriers pass and cause current flow in the external circuit. These regions may be separate or combined; thus, for example, the source may be a forward biased junction or barrier in the semiconductive body, the current region may be in the vicinity of a reverse biased junction or barrier, and the delay region may be of an intermediate region of one conductivity type; or the source may be separate while the delay and current regions may be integral.

The negative resistances disclosed here rely upon the transit time effects obtainable from certain semiconductive structures when operated under the proper conditions. Negative resistance at frequencies from of the order of a megacycle to of the order of thousands of megacycles can be realized with this type of device as compared to upper limits of the order of a megacycle for the semiconductive negative resistances of the prior art.

In one specific embodiment of this invention, a negative resistance is in the form of a single crystal germanium bar containing end zones of $n$-type material and an intermediate zone of $p$-type material. Ohmic connections are made to each of the $n$-type zones and the resulting diode is biased from a direct current source so that electrons are injected from the forward biased $p$-$n$ junction into the $p$ zone, diffuse through a portion of that zone at a relatively low rate and enter the space charge region surrounding the reverse biased $p$-$n$ junction. The field in the space charge region carries the electrons across this region at a high rate. An alternating voltage is superimposed on the bias, this voltage having a frequency so related to the transit time of charge carriers from the forward biased $p$-$n$ junction through the space charge region that a phase shift between the current and voltage of between 90 and 270 degrees occurs. The resulting diode negative resistance can be employed in a negative resistance oscillator by associating an impedance with it which is resonant with its reactance at the negative resistance frequency. The optimum negative resistance frequency of devices of this nature can be adjusted by varying the applied bias to change the transit time of injected charge carriers.

The above and other objects and features of this invention will be more fully appreciated from the following detailed description when read in conjunction with the accompanying drawings in which:

Figs. 10A through 10D illustrate a graphical means of determining whether a given plot of impulsive impedance against time will give negative resistance at some frequency;

Fig. 11 is a plot of another form of impulsive impedance against time;

Figure 12:
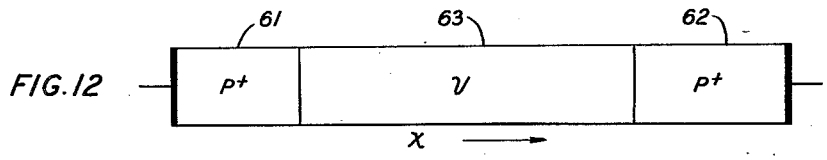
Fig. 12 is another form of negative resistance semiconductor illustrative of this invention.
Figure 13:
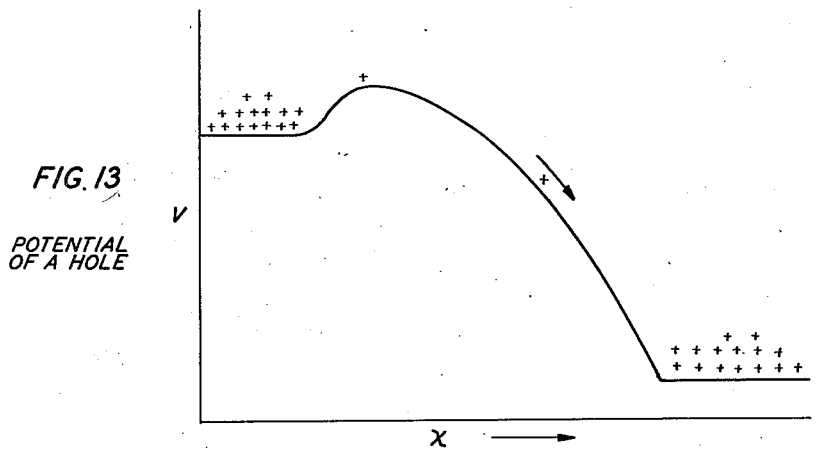
Figure 14:
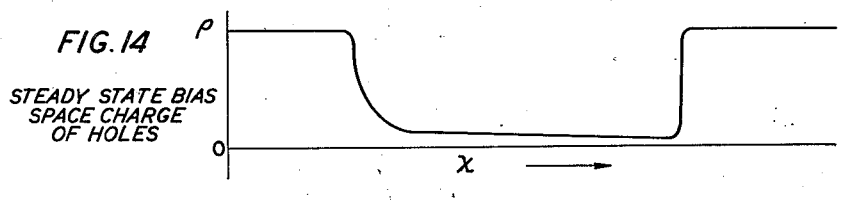
Figure 15:
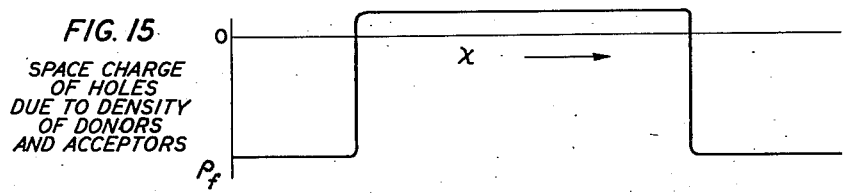
Figure 19:
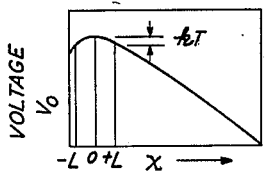
Figure 23:
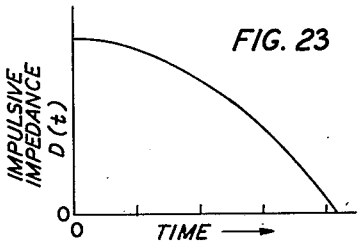
Figure 20A:
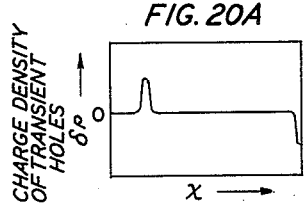
Figure 21A:
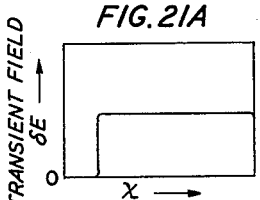
Figure 22A:
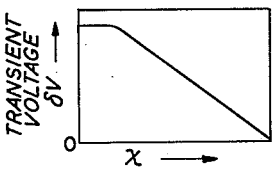
Figure 20B:
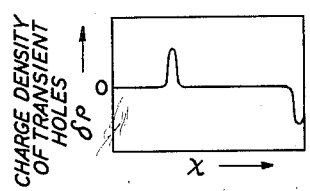
Figure 21B:
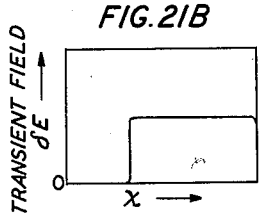
Figure 22B:
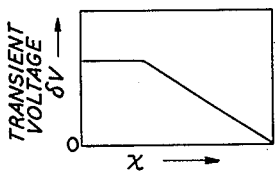
Figure 20C:
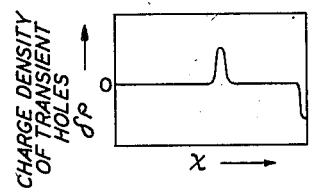
Figure 21C:
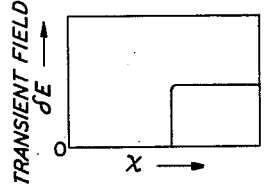
Figure 22C:
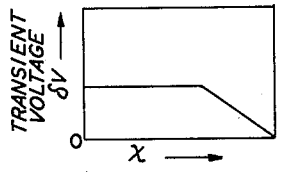
Figure 20D:
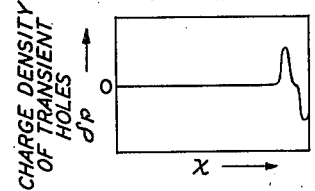
Figure 21D:
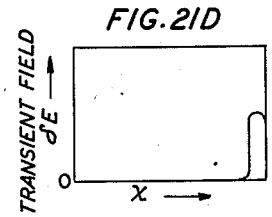
Figure 22D:
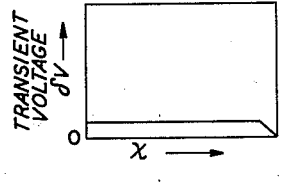
Figure 24:
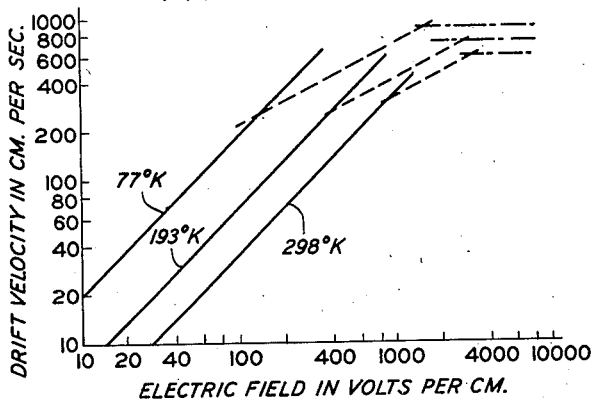
Figure 25:
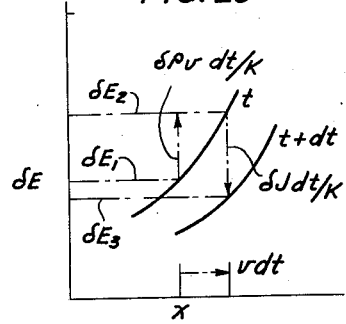
Figure 26:
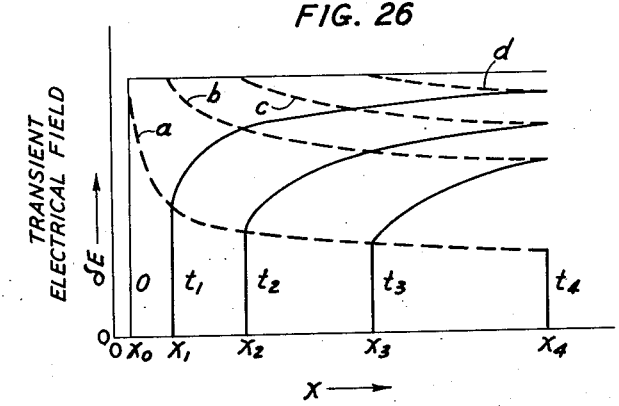
Figure 27:
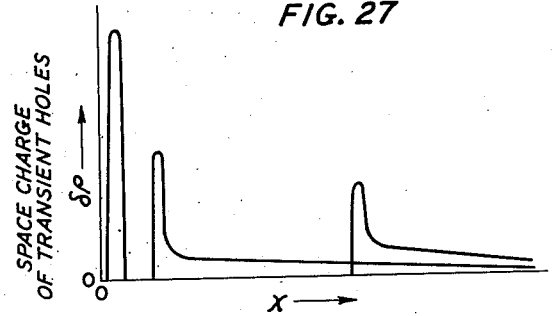
Figure 28:
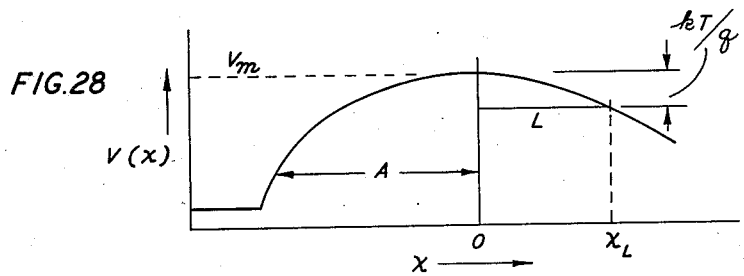
Figure 31:
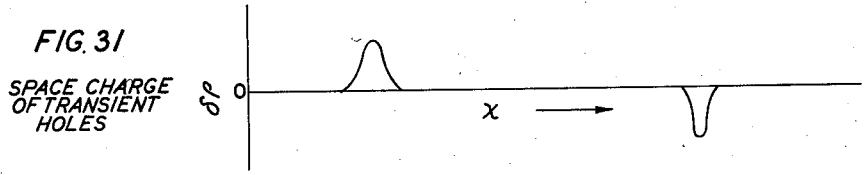
Figure 29:
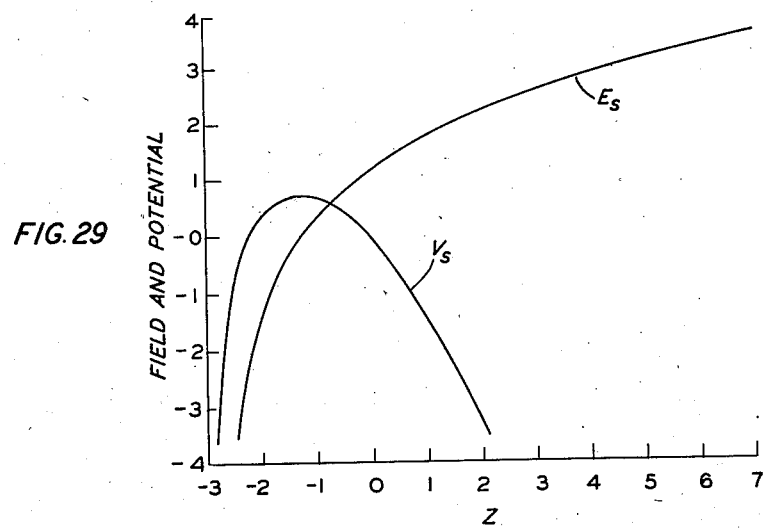
Figure 30:
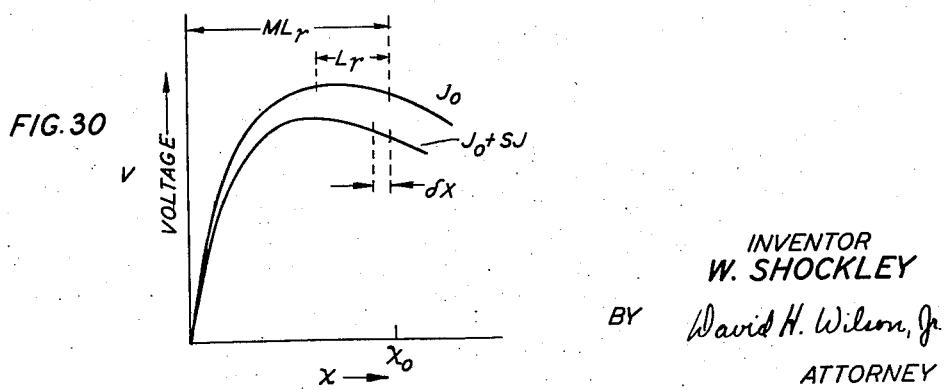
Figure 32:
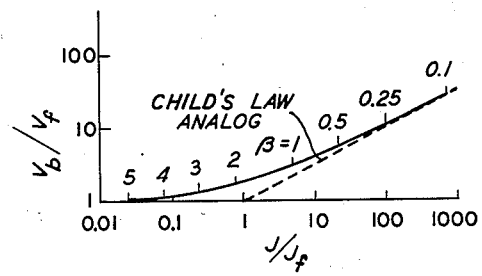
Figure 33:
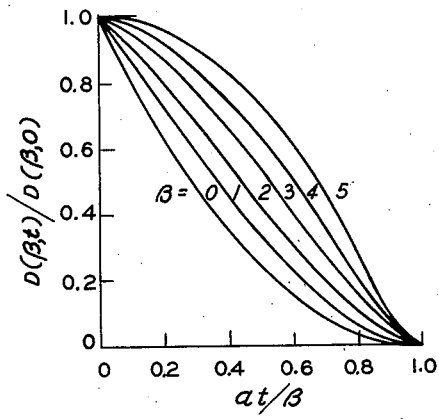
Figure 34:
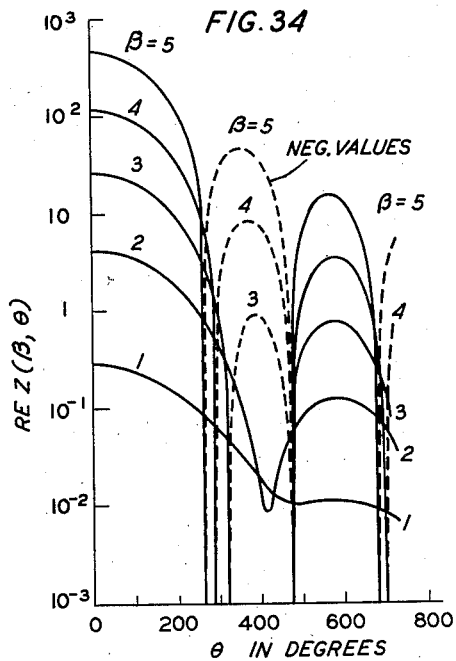
Figure 35:
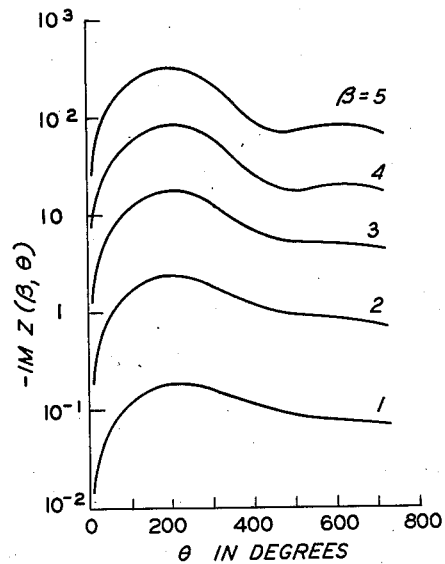
Figure 36:
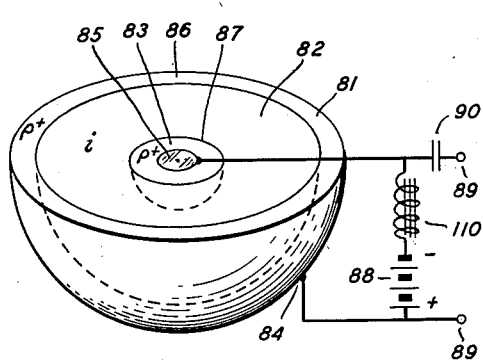
Figure 38:
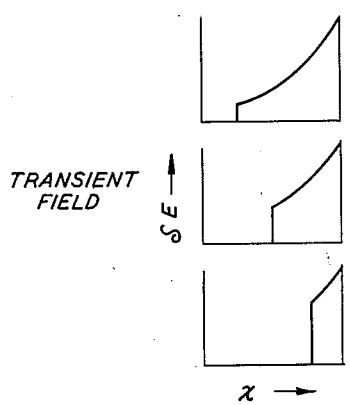
Figure 39:
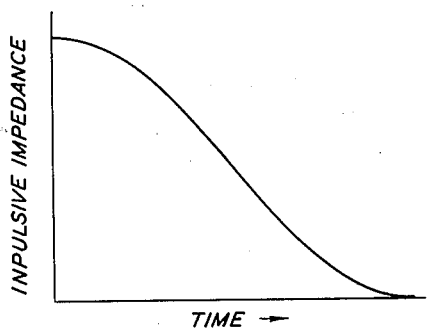
Figure 40:
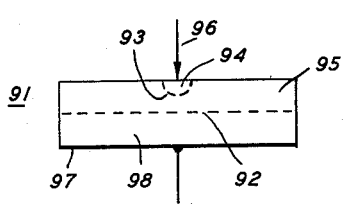
Figure 41:
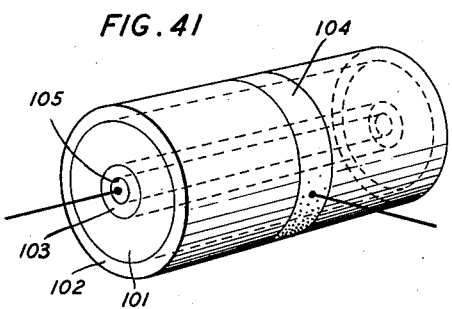

Figs. 13, 14 and 15, respectively, show the potential distribution, space charge of the holes, and the space charge due to the acceptors and donors, all with operating biases, along the length of the unit of Fig. 12;

Fig. 16 represents the instantaneous charge and field distribution along a semiconductive body of the type shown in Fig. 12 immediately after the application of an increment of charge;

Figs. 17 and 18 in parts A through C show the initial changes for successive instants of time in the charge density for the transient holes and in the transient field along a device of the type shown in Fig. 12 following the application of an increment of charge;

Fig. 19 is a plot of voltage distribution across the intermediate zone of $\nu$-type material of the unit of Fig. 12;

Figs. 20, 21 and 22 are plots of the charge density of transient holes, the transient field and the transient voltage, respectively, along the zone of $\nu$-type material of the unit of Fig. 12 at successive instants of time, parts A, B, C and D;

Fig. 23 shows the impulsive impedance of the zone of $\nu$-type material of the unit of Fig. 12 plotted against time;

Fig. 24 shows the relationship between charge carrier mobility and electric field for a typical semiconductor;

Figs. 25 and 26 illustrate means of evaluating the total derivative for the transient field on a plane moving across the drift region of the $\nu$-type zone of the unit of Fig. 12;

Fig. 27 represents the space charge due to the transient hole density along the weakly $n$-type zone of the unit of Fig. 12;

Fig. 28 is an enlarged portion of Fig. 13 showing the potential as a function of distance along the semiconductive body of Fig. 12 in the region of the potential maximum;

Fig. 29 is a plot of field distribution, $E_s$, and potential distribution, $V_s$, as functions of Z for the case of space charge limited emission;

Fig. 30 shows the relationship between potential and distance along the $\nu$-type zone of Fig. 12 for the case of space charge due to holes only;

Fig. 31 shows the distribution of added holes to the left of the potential maximum of the device of Fig. 12;

Fig. 32 depicts the current-voltage relationship for a $p^+$–$\nu$–$p^+$ structure neglecting diffusion and electrons;

Fig. 33 illustrates the impulsive impedance for various values of $\beta$ in a $p^+$–$\nu$–$p^+$ structure;

Figs. 34 and 35 show the real and imaginary portions of the impedance of a $p^+$–$\nu$–$p^+$ structure as a function of transit angle;

Fig. 36 shows one form of semiconductive diode, transit time negative resistance having a geometry which requires convergent current flow;

Figs. 37A through 37C are plots of the charge density of transient holes against distance through the intermediate zone of the diode of Fig. 36 at successive instants;

Figs. 38A through 38C are plots of transient electric field against distance through the intermediate zone of the diode of Fig. 36 at successive instants;

Fig. 39 is a plot of impulsive impedance against time for the diode of Fig. 36; and Figs. 40 and 41 illustrate other diode geometries in which convergent carrier flow occurs.

At the outset it will be helpful to an understanding of semiconductive negative resistances and their mode of operation to set forth definitions of certain terminology to be employed below together with a brief discussion of these terms. For a more complete exposition regarding these terms and their significance, reference is made to W. Shockley's book "Electrons and Holes in Semiconductors," published by D. Van Nostrand Co., Inc.

Conduction occurs in electronic semiconductors by means of two types of charge carriers, namely electrons, which are negative charge carriers, and electron deficits or holes, which may be considered as positive charge carriers. These carriers can be provided in the semiconductor in several ways including the application of sufficient energy to break an electron away from its semiconductive atom, thus creating an unbound electron and an unbound hole; the presence of lattice defects in the semiconductor structure; and the presence of certain elements in the crystal structure which have either an excess or a deficit of valence electrons so that they provide a source of unbound holes or electrons which can be released by the application of a low level of external energy to the crystal. Generically, those semiconductors wherein conduction is in the main by electrons are called $n$-type while those where conduction occurs by electron deficits or holes are called $p$-type. Where it is desirable to identify the characteristics of the materials with more particularity $n^+$ and $p^+$ will identify materials which have a marked predominance of the characteristic type of charge carrier. Nu, $\nu$, and pi, $\pi$, will be employed to signify that the material contains only a slight predominance of the characteristic type of carriers, i. e., $\pi$-type material is weakly $p$-type and $\nu$-type is weakly $n$-type. Intrinsic material, that in which the electrons and holes are in substantial balance, will be identified as $i$-type.

Silicon and germanium are semiconductors having a diamond cubic lattice form wherein each of the four valence electrons of each atom normally form an electron pair bond with a valence electron of each of four adjacent atoms. These materials occur both as $n$ and $p$ type and are readily controlled in their type by the presence of the above-mentioned elements. Those elements constituting impurities which contribute electrons to silicon and germanium semiconductors are termed donors and principally fall in the fifth group of the periodic table while those elements which contribute electron deficits are termed acceptors and generally occur in the third group of the periodic table. Typical donors include phosphorus, arsenic, and antimony, while boron, aluminum, gallium and indium are typical acceptors. Acceptors and donors will be referred to below as significant impurities to distinguish them from other materials which may be present in the semiconductor.

The conductivity and conductivity type of a semiconductor is dependent upon the predominance of donors or acceptors present, since donors and acceptors tend to cancel each other, the excess electron of the donor filling the electron vacancy of the acceptor. When the semiconductor contains a balance of electrons and holes at thermal equilibrium, it is identified as an "intrinsic semiconductor" while material in which one type of charge carrier predominates is known as "extrinsic." The conductivity transition regions between zones of opposite conductivity type in a semiconductive body are known as $p$–$n$ junctions or more generically as "barriers," this term applying to metal-semiconductor junctions, $p$–$n$ junctions, and extrinsic-intrinsic junctions wherein the energy levels on the two sides of the junction are different.

Some compounds are also effective electronic semiconductors, for example copper oxide, cadmium sulfide, thallius sulfide and lead sulfide may be employed. These materials may be either $n$ or $p$ type depending upon the donor or acceptor predominance present. Here the donors and acceptors may be provided by impurities, either as elements or compounds, or by deviations from the stoichiometric balance of semiconductive compounds.

Germanium and silicon semiconductive bodies having adjacent zones of the desired conductivity type can be produced by a number of techniques including the segregation of impurities while an ingot is progressively cooled as disclosed in Patents 2,567,970 and 2,602,211 of J. H. Scaff and H. C. Theuerer, September 18, 1951, and July 8, 1952, respectively, the heat treatment of a portion of the body at a particular temperature as taught in Scaff et al. Patent 2,602,763, July 8, 1952; the diffusion of impurities from the body surface into its bulk as disclosed in G. L. Pearson application Serial No. 270,370, February 7, 1952, now Patent 2,757,324, and C. D. Thurmond application Serial No. 321,405, November 19, 1952, now abandoned, and the addition of impurities to a melt as a body is formed therefrom. Advantageously, the semiconductive bodies employed in the negative resistances under discussion may be formed from single crystal material in the manner disclosed in patent applications Serial No. 138,354 of J. B. Little and G. K. Teal, January 13, 1950, now Patent 2,683,676, issued July 13, 1954; Serial No. 168,184 of G. K. Teal, June 15, 1950, now Patent 2,727,840, issued December 20, 1955; and Serial No. 256,791 of W. G. Pfann, November 16, 1951, now Patent 2,739,088.

Junctions produced by these methods have characteristics which enable them to be employed as sources or emitters of charge carries when energy is applied properly. A junction biased in the forward direction, i. e., with the applied voltage poled to draw that type of charge carrier predominating on one side of the junction across it, constitutes an excellent emitter, particularly when the emitting material contains a large predominance of the emitted type of carrier. Thus, electrons are emitted from $n$-$p$ junction into the $p$ zone when the latter is biased positive relative to the $n$ zone.

Means other than forward biased junctions for injecting charge carriers into a semiconductor include forward biased metallic contacts, reverse biased barriers having a field at some point in excess of the critical Zener field, and means for directing energy onto the semiconductor to excite electrons into the conduction band, e. g., heat, light and high energy particles.

A space charge region encompasses a reverse biased junction due to the tendency of the bias to draw the majority charge carriers out of the vicinity of the junction leaving ionized acceptors and donors on the $p$ and $n$ sides thereof respectively. The extent of this space charge region is dependent upon the applied voltage and inversely upon significant impurity predominance on each side of the junction. Hence, a junction which has a low acceptor predominance on the $p$ side and a high donor predominance on the $n$ side will have a space charge region extending a large distance from the center of the junction into the $p$-type material relative to its distance into the $n$-type material. An equal number of acceptors and donors must be ionized on the respective sides of the junction and this necessarily requires that a greater volume of the material having the low carrier density be affected. Space charge regions contain very high fields even for small biases. Hence, any carriers entering a space charge region will traverse it quickly, i. e., the transit time will be very small. Another characteristic of a space charge region is that it has a capacitance which is inversely proportional to its thickness.

It is to be understood that space charge regions can be established in semiconductors in several ways in addition to applying a reverse bias across a p-n junction. For example, a space charge region may be established in a semiconductive body adjacent a metallic connection thereto by biasing the barrier between the two in the reverse direction, i. e., so that the voltage tends to draw minority carriers out of the semiconductor. As another example, such a region may be produced by applying a suitable potential between the semiconductor and insulator contiguous therewith.

While the following detailed described is directed particularly to devices having semiconductive bodies of silicon or germanium, this invention is not limited to these materials but rather is applicable to any electronic semiconductor in which suitable concentrations of acceptor and donor centers can be established.

Figure 1:
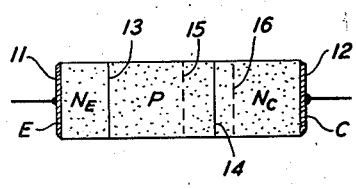
Fig. 1 is a diode negative resistance as disclosed in the above-identified application of which this is in part a continuation.
Figure 2:
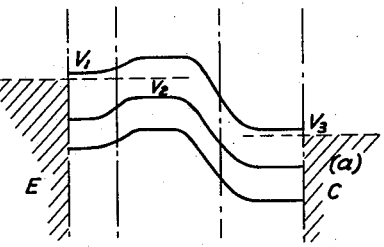
Fig. 2 is an energy level diagram of the diode of Fig. 1.

A transit time negative resistance is shown in Fig. 1 and its energy level diagram is depicted in Fig. 2. A semiconductive diode structure as shown in Fig. 1 can be used as a negative resistance element at very high frequencies making use of transit time effects. It comprises three substantially parallel layers $N_E$, P and $N_C$ of alterating excess significant impurity content with two metal electrodes 11 and 12, one at either side. In the example shown, the conductivity is supposed to be due entirely to electrons although it is to be understood that this and other forms of devices described herein will also operate with holes as the principal carriers by employing appropriate types of material and proper electrical parameters. When voltages are applied as indicated at $a$ in Fig. 2, there will be an electron current flowing from $N_E$ to $N_C$. This current will of course increase with increasing applied potential. When the potential $V_3$ is increased, there will be a corresponding increase in the potential $V_2$. As a consequence of this, the electron flow from $V_1$ through the P region of $V_2$ will be increased. However, there will be a time lag between the increase of $V_3$ and the actual flow of electrons from P to $N_C$. As a consequence of this, the electron current flowing between P and $N_C$ will be out of phase with the voltage $V_3$. With the type of structure shown, this phase lag will be sufficient so that the current flowing between P and $N_C$ can be made more than 90 degrees out of phase with the voltage on $V_3$. Under these conditions the impedance of the device as viewed looking in on the $V_3$ terminal will exhibit negative resistance.

The theory of somewhat related electronic devices involving negative resistance due to transit time is known in the literature. See, for example, the Bell System Technical Journal, January 1934 (vol. 13), and October 1935 (vol. 14). In order for such devices to operate, it is necessary that the transient response for a change in voltage on $V_3$ have a suitable characteristic. The principal requirement of this characteristic is that the build-up in current following the change in $V_3$ should occur with a certain delay after the change in $V_3$. In the type of device shown in Fig. 1, this desired feature will occur automatically. The reason for this is that electrons drift relatively slowly through the P region whereas they will traverse the space charge region of the P to $N_C$ gap rapidly because of the high electric field present there. As a consequence of this, electrons which flow from $N_E$ to P during one phase of $V_3$ carry their principal current from P to $N_C$ at a later time and can thus be made to flow more than 90 degrees out of phase with the voltage applied to $V_3$ and in this way furnish negative resistance.

A preliminary consideration of the negative resistance of this invention and their modes of operation wherein certain factors of semiconductive behavior have been neglected to simplify the explanation follows. A more rigorous general approach to negative resistances together with exemplary semiconductive embodiments is presented following this simplified explanation.

For this purpose the structure of Figs. 1 and 2 will be considered for conditions similar to those prevailing in an n-p-n transistor. Under these conditions, except for the space charge region between P and $N_C$, the concentration of injected electrons in the p-region will be small compared to the concentration of holes and the electron current will be carried primarily by diffusion. The high concentration of holes and resultant high conductivity will prevent alternating electric fields from appearing in the p-region. Thus, the applied alternating current voltage across the device, which may be expressed as $V_3$ exp $i\omega t$, will be developed chiefly across the two p-n junctions 13 and 14. Furthermore, since the junction 14 between P and $N_C$ is biased in the reverse direction, its impedance will be high compared to that of the junction 13 between $N_E$ and P which is biased forward.

For a forward biased p-n junction the impedance may be well approximated by considering the effects of the diffusion currents alone. This conclusion follows from the theory of p-n junctions as developed by W. Shockley in the Bell System Technical Journal, vol. 28, 435 (1949) and has been confirmed by experiment as reported by F. S. Goucher, G. L. Pearson, M. Sparks, G. K. Teal and W. Shockley, Physical Review, vol. 81, 637 (1951). Furthermore, as discussed in the parent application, now Patent 2,569,347, the relative contribution due to the flow of holes across the $N_E$-P junction may be made small by making $N_E$ of much higher conductivity material than P. On the basis of these approximations, the relationship between current and voltage across the $N_E$-P junction may readily be evaluated by standard mathematical techniques. If the further approximation is made that few electrons combine with holes in crossing the p-region, the electron density in the p-region, wherein D is the diffusion constant for electrons, takes the form:

$n(x,t) = n_1[\exp-(1+i)\times(\omega/2D)^{1/2}$
$\quad -\exp (1+i)\times(\omega/2d)^{1/2}] \exp (i\omega t)^{1/2}$ (1.1)

where $x=0$ corresponds to the edge 15 of the space charge region where $n$ is substantially zero, and $x=-L$ is the $N_E$-P junction. At $x=-L$, practically all of the A. C. current denoted by $I_a$ is carried by electrons. The electron current at $x=0$ is smaller by a factor $\beta$ where $\beta$ may readily be evaluated by comparing the values of $\partial n/\partial x$ from the above expression for $n(x,t)$, Equation 1.1. The result is:

$\beta = 2 [\exp (1+i)(L^2\omega/2D)^{1/2} + \exp$
$\quad -(1+i)(L^2\omega/2D)^{1/2}]^{-1}$ (1.2)

Near $x=0$ the remaining current is carried by holes for $x<0$ and as a displacement current for $x>0$ corresponding to the capacity of the space charge region. This capacity $C_2$ is the same as that of a dielectric having the dielectric constant of the semiconductor and the dimensions bounded by planes 15 and 16 defining the edges of the space charge region of Fig. 1. If the alternating current voltage across this region is $V_2$ exp $(i\omega t)$, then the current is:

$$(1-\beta)I_a = i\omega C_2 V_2 \exp (i\omega t) \quad (1.3)$$

Hence the ratio of voltage to total current across this region is $$V_2 \exp i\omega t/I_a = \frac{1-\beta}{i\omega C_2} \quad (1.4)$$

Since a preponderant portion of the alternating current voltage drop occurs across the P-$N_C$ junction, this ratio can be equated approximately to the impedance of the structure.

$$V_2 \exp i\omega t/I_a = (-i+i\beta)/\omega C_2 \quad (1.5)$$

This impedance has a negative real part over most of the range of values for which $$\pi < (L^2\omega/2D)^{1/2} < 2\pi$$

Under these conditions the first term dominates the denominator in $\beta$ so that the phase of $i\beta$ varies from $-90$ through $-180$ degrees to $-270$ degrees. At $(L^2\omega/2D)^{1/2}$ equal to $5\pi/4$, the value of $i\beta$ is approximately:

$$2i \exp[-5(1+i)\pi/4] = -0.028 (1+i) \quad (1.6)$$

This shows that the injected electrons contribute about 3 percent to the capacity and add a negative resistance giving the condenser a Q of about $-33$.

Figure 3A:
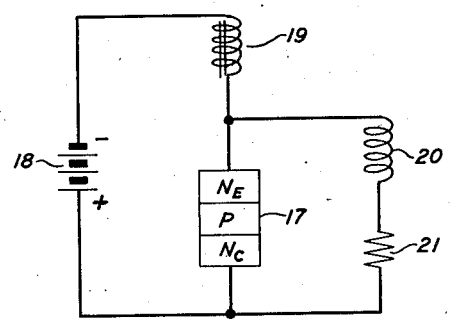
Figs. 3A and 3B are oscillator circuits utilizing the negative resistance devices of this invention as the driving element.

Such a circuit element may be used to make an oscillator as shown in Fig. 3A. In this circuit the unit 17 is supplied from a high impedance source such as a battery 18 and a choke coil 19. An inductance 20 and a resistive load 21 are connected in series across the unit. The inductance is chosen so that it resonates with the condenser with $$\omega = (25\pi^2/8)D/L^2 \quad (1.7)$$

and the inductance plus load plus choke coil should have a Q of 33 or larger. Under these conditions, the combined circuit has a negative Q and oscillations will build up until non-linear effects limit the amplitude.

Figure 3B:
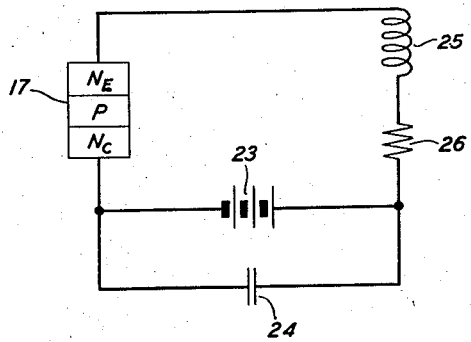

An alternative oscillator circuit arrangement is depicted in Fig. 3B wherein the biasing source, battery 23, is shunted to the signal frequencies by a capacitance 24. In this circuit inductance 25 is chosen to resonate with the combined capacitance of the unit and the shunting capacitance at a frequency in the band in which negative resistance operation is obtained. Again the combined circuit including the load 26 should have a negative Q.

Inspection of the equation used in deriving $\beta$ shows that for delay due to diffusion, there is attenuation. In fact, the effect of the exponential $\exp(1+i)(L^2\omega/2D)^{1/2}$ is to introduce a factor of $\exp(-1) = 0.365$ for each radian of delay. This adverse attenuation can be substantially reduced by incorporating an electric field in the $p$-region which causes the electrons to drift as well as to diffuse. For this case the diffusion equation becomes:

$$n = D\partial^2 n/\partial x^2 - V\partial n/\partial x \quad (1.8)$$

where V is the drift velocity due to the field. For a periodic variation the solution may be written in the form:

$$n = (\exp a_1 x - \exp a_2 x) \exp i\omega t \quad (1.9)$$

where $$a_1 = \frac{V}{2D}\left[1 - \left(1 + \frac{4i\omega D}{V^2}\right)^{1/2}\right] \quad (1.10)$$

$$a_2 = \frac{V}{2D}\left[1 + \left(1 + \frac{4i\omega D}{V^2}\right)^{1/2}\right] \quad (1.11)$$

The real part of the coefficient $a_1$ is smaller than the imaginary part and this results in relatively smaller attenuation for a given phase lag. For example, if the electric field produces a potential drop of $2kT/q$ ($=0.05$ volt at 300 degrees Kelvin) in the distance L and if $\omega$ is so chosen that $\omega L/V = 12.5$, then the value of $i\beta$ is approximately $i\beta \doteq -0.085 - 0.15i$.

Thus, the effective value of Q is changed from $-33$ to $-13$ by incorporating an electric field.

One way of producing the desired electric field is to employ a $p$-region in which the hole density decreases exponentially with distance in the direction of electron flow. Such a decrease can be obtained by utilizing a $p$-region having an acceptor concentration gradient which corresponds to the desired density of distribution. This decrease requires that the electrostatic potential increase linearly in the plus $x$ direction. If the hole density falls by a factor $\exp(-2) = 0.135$ in this distance, the potential difference of $2kT/q$ used in the previous example will be produced. This method of producing the electric field has the advantage that it requires no hole current to flow. It is possible to produce similar fields by the potential drops due to hole flows in the $p$-region opposite to the direction of electron flows.

In this introductory treatment, delay in crossing the space charge region has been neglected. In general, it will be very short compared to the time spent in diffusing through the $p$-regions so that the current of electrons across the space charge layer is practically the same as the current entering the space charge layer. In order to maximize frequency response while keeping the dimensions the same, it is desirable to have high fields throughout the structure. Such possibilities are considered in the development that follows.

Full understanding of the invention will be facilitated by a detailed analysis of the basic principles and relationships of parameters involved. Such analysis follows. For convenience of reference, a table of the symbols employed in this analysis is presented here.

$C$ = capacitance
$D(t)$ = impulsive impedance
$E$ = electric field
$i = \sqrt{-1}$
$Im$ = imaginary part of a value
$J$ = current
$K = \kappa\epsilon_0$ or dielectric constant of the material, in the MKS system
$k$ = Boltzmann's constant
$L$ = distance
$n_i$ = density of electrons in conduction band in intrinsic material
$N_d$ and $N_a$ = density of donors and acceptors
$Q$ = charge
$q$ = charge on an electron
$R$ = resistance
$Re$ = real part of a value
$Tt$ = transit time
$T$ = absolute temperature
$t$ = time
$V$ = voltage
$V_b$ = bias voltage
$v$ = velocity of charge carriers
$W$ = thickness
$W_p$ = sum of the widths of the $p$-layers
$x$ = the distance along a semiconductive body
$y = E/E_r$ (see Equation 6.22)
$Z$ = impedance
$z = x/L_r$ (see Equation 6.23)
$\alpha = \mu\rho_f/K$ (see Equation 5.12)
$\beta = \alpha Tt$ (see Equation 5.16)
$\epsilon_0$ = dielectric constant of free space MKS
$\eta = KkT/q(\frac{1}{2})$ (see Equation 6.20)
$\kappa$ = dielectric constant
$\mu$ = mobility of charge carriers
$\mu^*$ = differential mobility of charge carriers (see Equation 3.24)
$\rho$ = charge density
$\rho_f = q(N_d - N_a)$
$\tau$ = relaxation time (see Equation 6.40)
$\theta$ = transient angle
$\omega$ = circular frequency
$\sigma$ = conductivity

1. THE IMPULSIVE IMPEDANCE

The characteristics of the two terminal devices considered may be conveniently described in terms of the impulsive impedance, denoted by $D(t)$. In this section $D(t)$ has the dimensions of "stiffness" or reciprocal capacity. In later sections it will be convenient to deal with current densities and electric displacement, which are defined on a unit area basis. In this section, however, in which we are concerned with the properties of a two terminal circuit, it would be inconvenient to refer to resistances and reactances as ohm cm.$^2$ etc. Consequently we shall consider the two terminal devices of this section as unit areas of the structures of subsequent sections.

The current J in amperes of this section is thus equivalent to the current density J of the subsequent sections.

The impulsive impedance with which we are concerned is defined in terms of the voltage produced by the addition of a pulse of charge to the biasing current J. If a large transient current flows for a very brief time at time $t_o$ so as to add an extra charge $\delta Q_o$ to the total charge carried by J, then the voltage at times after $t_o$ is, by definition of $D(t)$, $$V(t) = V_b + \delta Q D(t-t_o) \quad (2.1)$$

where $V_b$ is the bias voltage corresponding to J. From this it is evident that D has the dimensions of farads$^{-1}$.

If an A. C. current $J_1(t)$ flows, the resulting voltage may be calculated by considering $J_1(t)$ to be made up of infinitesimal elements of charge $$dQ = J_1(t') dt' \quad (2.2)$$

added at times $t'$. The voltage is the sum of those produced by these charges so that $$V(t) = V_b + \int_{-\infty}^{t} J_1(t') D(t-t') dt' \quad (2.3)$$

In the integral $J_1(t') dt'$ is the charge added during $dt'$ at time $t'$. This charge produces a voltage equal to the charge times $D(t-t')$ since the time $t$, when the voltage is observed, is later than $t'$ by an amount $t-t'$. By introducing $t'' = t - t'$, the integral may be changed to the form $$= V_b + \int_0^{\infty} J(t-t'') D(t'') dt'' \quad (2.4)$$

which is somewhat more convenient for some purposes.

Figure 4A:
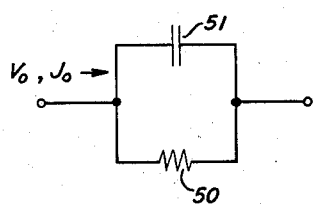
Figs. 4A and 4B show an equivalent circuit of an illustrative two terminal device and a plot of its impulsive impedance (defined below)

It may be helpful to illustrate this formula by applying it to the simple case shown in Fig. 4A representing a two terminal network comprising a resistance 50 of magnitude R and a capacitance 51 of magnitude C connected in parallel. For this case it is evident that an impulse of charge $\delta Q_o$ will produce a voltage $\delta Q_o/C$ and that this added voltage will decay exponentially with the time constant RC so that $$D(t) = (1/C) \exp(-t/RC) \quad (2.5)$$

Figure 4B:
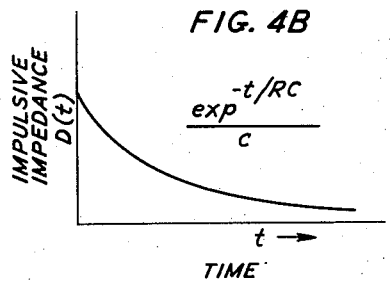

This relationship between the impulsive impedance and time is plotted in part (B) of Fig. 4. We shall assume that an A. C. current of circular frequency $\omega$ is applied to the network of Fig. 4A so that $$J(t) = J + J_1 \exp(i\omega t) \quad (2.6)$$

Inserting this in the integral for $V(t)$ leads to $$V(t) - V_b = \int_0^{\infty} (J_1/C) \exp[i\omega(t-t') - t'/RC] dt'$$

$$= J_1/C(i\omega + 1/RC)] \exp(i\omega t)$$

$$= (J_1 \exp i\omega t)/(i\omega C + 1/R)$$

$$= Z(\omega) J_1 \exp i\omega t \quad (2.7)$$

In the last equation $Z(\omega)$ is simply the impedance of the parallel combination of Fig. 4A, which is the reciprocal of the admittance in the denominator of the previous line. Thus we see that the use of the impulsive impedance $D(t)$ for this case leads to the familiar impedance formula for the circuit.

Of particular importance in this discussion are devices having negative resistances at certain frequencies. The occurrence of a negative resistance is possible for some forms of impulsive impedance but not for others. For the case of the exponentially decaying $D(t)$ of Fig. 4B, the impedance defined in Equation 2.7 may be rewritten in the form $$Z(\omega) = R(1 - i\omega RC)/(1 + (\omega RC)^2) \quad (2.8)$$

so that the real part of $Z(\omega)$ is positive.

The real part of $Z(\omega)$ may be obtained directly from Equation 2.4 by taking the real and imaginary parts of the current $J_1 \exp(i\omega t)$. This leads to $$ReZ(\omega) = \int_0^{\infty} \cos \omega t D(t) dt \quad (2.9)$$

$$ImZ(\omega) = \int_0^{\infty} \sin \omega t D(t) dt \quad (2.10)$$

It is sometimes convenient to integrate 2.9 by parts thus obtaining $$ReZ(\omega) = \omega^{-1} \sin \omega t D(t) \Big|_0^{\infty} - \omega^{-1} \int_0^{\infty} \sin \omega t D'(t) dt \quad (2.11)$$

where $$D'(t) \equiv dD(t)/dt \quad (2.12)$$

The first term is zero since $\sin \omega t$ vanishes at the lower limit and $D(t)$ at the upper. This leads to $$ReZ(\omega) = \omega^{-1} \int_0^{\infty} \sin \omega t (-D'(t)) dt \quad (2.13)$$

We shall next consider the possibility of obtaining a negative resistance from various forms of the $D(t)$ curve.

Figure 5A:
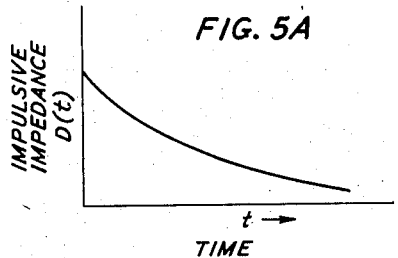
Figs. 5 through 8 depict in their respective parts A through D plots of impulsive impedance against time for various diodes, a cosine wave of the applied signal, the negative first derivative of impulsive impedance with respect to time and a sine wave of the applied signal.

In Fig. 5A we represent the case of an exponential decay, which we treated analytically above. We shall reach the same conclusion here by graphical reasoning in order to illustrate certain properties of the integrals 2.9 and 2.13. The curves for $D(t)$ and $-D'(t)$ are similar in shape for this case. A negative resistance cannot occur since both the integrals 2.9 and 2.13 are positive. For the case of 2.9 we consider the first 360 degrees of the cosine wave as shown in Fig. 5B. Inspection shows that the ratios of the integrals over quadrants I and III is the same as between II and IV. Since I is positive and larger than III, I and III make a positive contribution. Since II is smaller than I, the I and III contribution is not cancelled by the negative contribution of II and IV. Hence each cycle of cosine wave gives a positive contribution to $ReZ(\omega)$.

Figure 5C:
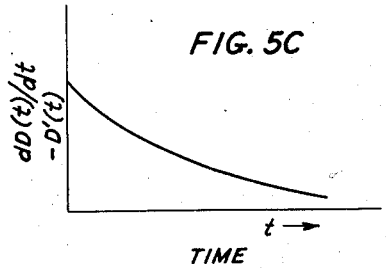
Figure 5B:
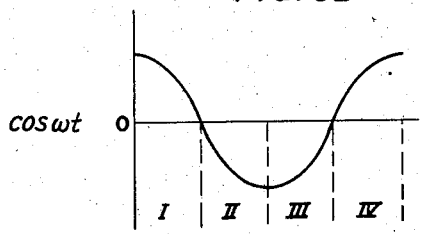
Figure 5D:
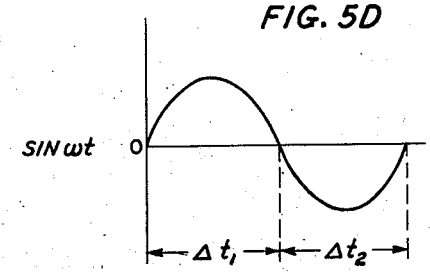

The same result may be seen more easily from the second expression 2.13 as graphically represented by Figs. 5C and 5D. Here we see that the interval $\Delta t_1$ gives a positive contribution larger than $\Delta t_2$ and the same will hold true for subsequent cycles.

Figure 6A:
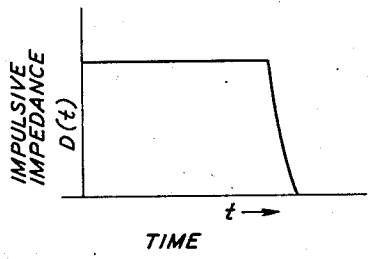

Fig. 6A shows a favorable case in which $D(t)$ holds up for a time and then drops abruptly. If $\omega$ is chosen so that there are about 270 degrees during the sustained interval for $D(t)$, then the integral from 90 degrees to 270 degrees will give a negative contribution larger than the positive one arising from 0 degrees to 90 degrees. Hence a negative resistance will arise from this form of $D(t)$ for properly selected frequencies.

Figure 6C:
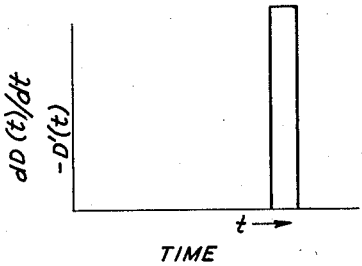
Figure 6B:
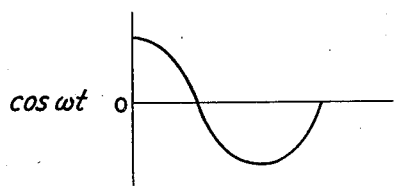
Figure 6D:
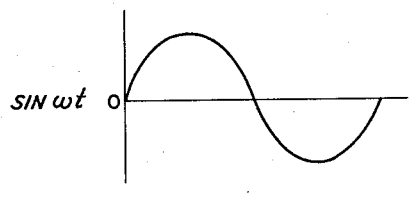

The same result may be seen more readily from the $D'(t)$ curve, Fig. 6C. For the same frequency as before, it is evident that the integral is negative or zero for this case.

Figure 7A:
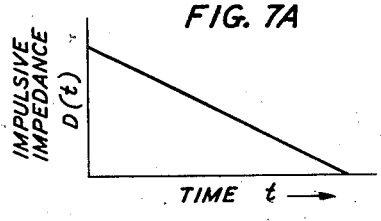
Figure 7C:
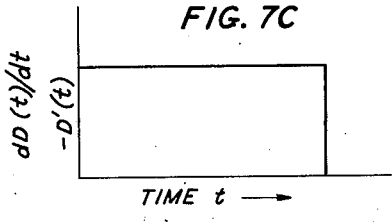
Figure 7B:
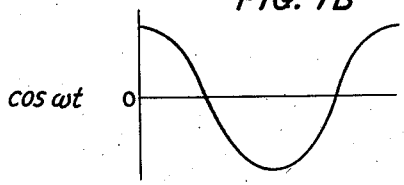
Figure 7D:
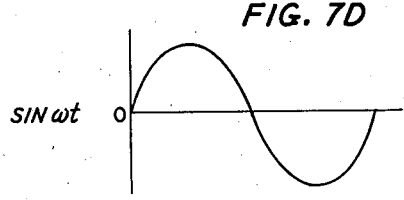

Fig. 7A shows a marginal case in which no negative resistance can be obtained but the limiting value of zero for the positive resistance can be reached. For this case of the linear decay, Fig. 7A, with constant value of $D'(t)_1$, Fig. 7C, zero resistance occurs when the decay to zero takes exactly one cycle. This conclusion follows from the fact that the integral over one cycle of the sine wave is zero.

Figure 8A:
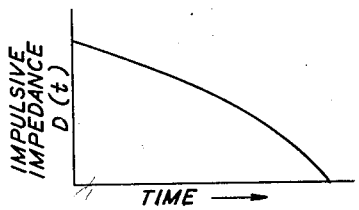
Figure 8C:
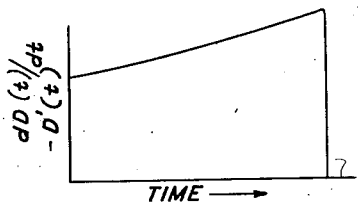
Figure 8B:
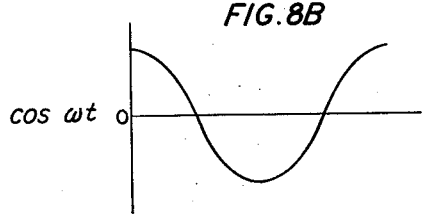
Figure 8D:
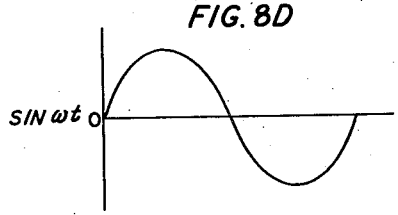

A slight deviation from linear decay can give the possibility of a negative resistance as shown in Fig. 8A. For this case $-D'(t)$, Fig. 8C, increases monotonically and then drops abruptly to zero. For the case of 360 degrees of sine wave during the decay time, it is evident that the integral from 180 degrees to 360 degrees is negative and exceeds that from 0 degrees to 180 degrees so that a negative resistance is obtained.

Figure 9A:
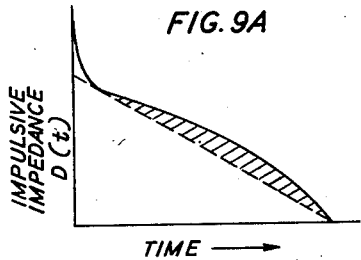
Figs. 9A and 9B are plots of impulsive impedance against time while parts C and D are cosine waves of the applied signal.
Figure 9B:
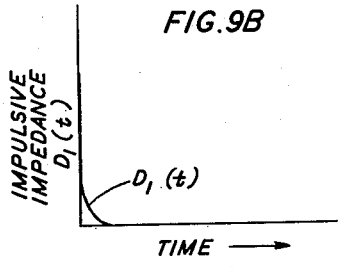
Figure 9C:
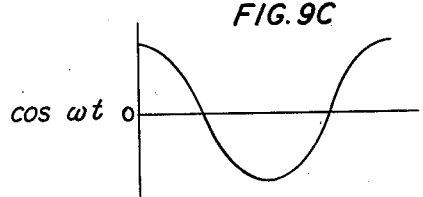
Figure 9D:
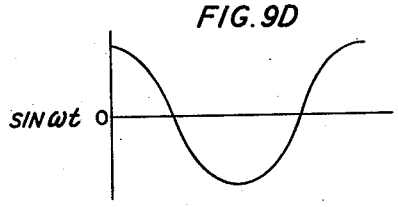

In Fig. 9A we represent a curve for $D(t)$ which may be approximated by a curve of the form of Fig. 8A plus a very short decay like that of Fig. 5A. The short decay is represented separately as $D_1(t)$ in Fig. 9B. The $D_1(t)$ term contributes a real resistance given by $$ReZ(\omega)_1 = \int_0^\infty \cos \omega t D_1(t) dt$$

$$\doteq \int_0^\infty D_1(t) dt = R_1 \qquad (2.14)$$

the approximation holding for the case represented in Fig. 9B. From this we see that a short initial decay corresponds to a small positive resistance added to $Z(\omega)$. If the cross-hatched area, which is assumed to be of the shape shown in Fig. 8A and contributes to the negative resistance, is large compared to the area $R_1$, then a negative resistance will still be obtained at a suitable frequency.

In Fig. 10A we illustrate a graphical means of estimating whether or not a given $D(t)$ curve is likely to give a negative resistance at some frequency. For this purpose $D(t)$ is resolved into three components which are determined by the frequency selected for test. If the period of the test frequency is $4t_1$, then the components are:

$D_1(t)$, a constant value $A_1$ up $4t_1$ and zero thereafter, Fig. 10B
$D_2(t)$, a straight line falling to zero at $4t_1$, Fig. 10C
$D_3(t)$, the residue consisting of $D(t) - D_1(t) - D_2(t)$, Fig. 10D.

$D_1(t)$ gives zero resistance since in Equation 2.9 it gives a value of zero for an integral over a complete cosine wave. $D_2(t)$ gives zero resistance for the reasons discussed in Figs. 7A through 7D. If the straight line of Fig. 10A has been drawn so as to intersect $D(t)$ at points $t_1$ and $3t_1$, then evidently $D_3(t)$ will be opposite in sign to $\cos \omega t$ for the first quadrant, $0 < t < t_1$ and the second and third quadrants, $t_1 < t < 3t_1$, and for some of the fourth quadrant. For the case illustrated, it is evident from inspection that the opposite sign areas dominate and that a negative resistance will occur for the selected frequency.

In Fig. 11 we illustrate a case that may occur for some structures of interest. In this case $D(t)$ may be resolved into a short decay, similar to that discussed in Fig. 10 and a term $D_1(t)$ which persists indefinitely. The $D_1(t)$ may be considered as the limiting case of the RC circuit as R approaches infinity. Under these conditions $D_1(t)$ gives an impedance.

$$Z_1(\omega) \doteq (R\omega^2 C^2)^{-1} + (i\omega C)^{-1}$$

The resistive term vanishes as $R$ approaches infinity and the reactive term is simply that of a capacitance $C = 1/D_1$. Hence a long decay, like that of Fig. 11, simply adds a capacitance in series with the Z produced by $D_2$. This behavior is the opposite extreme of the case of an abrupt initial decay, like that of Fig. 9A, which adds a series resistance.

The cases treated are not exhaustive but make it evident that negative resistances can be obtained from two terminal devices with suitable impulsive impedance characteristics. An important feature which it is desirable to produce is an interval of time with relatively high values of $-D'(t)$ compared to values at earlier times. It is also apparent from Equations 2.9 and 2.13 that the value of negative resistance can be adjusted by an adjustment of the period of the signal relative to the decay time of the impulsive impedance across the unit. Thus, negative resistance to the signal will be realized if the sum of the areas under the impulsive impedance versus time characteristic occurring in the second and third quadrants of the signal period is greater than the sum of the areas in the first and fourth quadrants.

2. THE TRANSIENT EQUATION

A. Introduction

Transient effects in semiconductive devices exhibiting negative resistance will now be considered. In the interest of clarity the discussion of the mode of operation which follows will be restricted to that in which only one form of charge carrier is present, although it is to be understood that transit time negative resistance can be realized with both types of carriers contributing to the operation. A specific example of operation with both type carriers is set forth in detail in W. T. Read application Serial No. 438,917, filed June 24, 1954, wherein a Zener current source in the center of a junction is employed as an emitter of holes and electrons, both of which flow to the edges of the surrounding space charge region to provide the current-voltage phase relationship which effects negative resistance.

The flow of the type of charge carrier predominating in a zone of semiconductive material can be suppressed by providing an adjacent zone containing a smaller quantity of those carriers contiguous with said zone and biasing the junction between them in the reverse direction. The predominating carriers are forced out of the zone by the biasing field which tends to replace those carriers with carriers drawn from the adjacent zone. However, since the density of these carriers in the second zone is low relative to those in the first zone, the withdrawn carriers are not replaced and a depletion of carriers in the first zone results.

In this section we shall consider transient effects in structures containing holes but no electrons in significant quantities. The choice of holes is dictated by the algebraic simplicity of their positive sign. In addition to the space charge of the holes denoted by $\rho$ for the steady state bias condition, we shall suppose that there is also a space charge due to an unchanging density $N_d$ and $N_a$ of donors and acceptors. Poisson's equation then takes the form for the steady state condition $$\kappa \epsilon_0 \partial E / \partial x = \rho + \rho_f \qquad (3.1)$$

where $$\rho_f = q(N_d - N_a) \qquad (3.2)$$

where $q$ is the magnitude of the charge on the electron and $\kappa$, $\epsilon_0$ and E have their customary significance in the MKS system. We shall let $$K = \kappa \epsilon_0 \qquad (3.3)$$

for brevity.

One structure of particular interest is shown in Fig. 12. It consists of a semiconductive body having end zones 61 and 62 of strongly p-type material, $p^+$, containing large acceptor predominances as indicated in Fig. 15 and an intermediate zone 63 of $\nu$ material containing a small donor predominance.

For such a structure the distribution of potential and charge density with operating biases will be of the form shown in Figs. 13, 14 and 15.

In accordance with the simplifying assumptions, no electrons are represented in this figure. Electron accumulations can be suppressed provided the hole density at the potential maximum is large compared to the value $N_i$ characteristic of intrinsic material.

We shall deal throughout this section with current densities and with other quantities on a unit area basis. The quantity $D(t)$ will thus have the dimensions of area per farad. The charge added at $t=0$, will be denoted by $\delta Q_0$; $\delta Q_0$ has the dimension of charge per unit area. Other charges per unit area which vary with time will be denoted by $\delta Q$ or $\delta Q(t)$.

We shall first describe in qualitative terms some of the effects that occur subsequent to the addition of a charge $\delta Q_0$ as discussed in Section 1. We shall suppose that this charge is added instantaneously with $+\delta Q_0$ on the left boundary plane terminal of Fig. 16 and $-\delta Q_0$ on the right boundary plane terminal. Immediately after the application of the charge, the distribution of potential will be the same as that of a parallel plate condenser having the dielectric constant of the semiconductor in the structure. The transient charge distribution and transient electric field will then be as represented in Figs. 17 and 18, parts (A) through (C) representing the condition in the body at successive instants of time. The fringing electric fields are relatively unimportant and will be neglected. The charge distribution will consist of two infinitesimally thin sheets of charge.

The voltage drop may be calculated from Poisson's equation which may be written in the form $$K(\partial/\partial x)(E+\delta E)=\rho(x)+\rho_f(x)\delta\rho(x,t) \quad (3.4)$$

where E and $\delta E$ are steady state and transient electric fields, $\rho$, $\rho_f$, and $\delta\rho$ are the charge densities for steady state holes, Fig. 14, donors and acceptors, Fig. 15, and the transient holes, Figs. 17 (A) through (C), respectively. The transient part of the equation is $$K(\partial/\partial x)\delta E=\delta\rho \quad (3.5)$$

To the left of $x=x_l$, $E=0$ in accordance with Fig. 16. The value to the right of the charge $+\delta Q$ is $$\delta E(x)=(1/K)\int_{x_l}^{x}\delta\rho dx=\delta Q/K \quad (3.6)$$

This field persists until the right edge of the structure. For $x$ greater than $x_r$, the contribution to the integral from $-\delta Q_0$ cancels that due to $+\delta Q_0$ and gives $E=0$. The voltage resulting from this field is $$(\delta Q_0/K)(x_r-x_l) \quad (3.7)$$

This is the correct relationship for charge and voltage for a condenser of dielectric constant K and thickness $x_r-x_l$.

B. Relaxation in the p+ layers

We shall next consider the relaxation of the charge distribution. We shall consider first the $p^+$ layer on the left, zone 61. In this layer the transient electric field is $\delta Q_0/K$ and consequently the current density is initially $$\delta J=\sigma\delta Q_0/K \quad (3.8)$$

This current density is independent of $x$ and consequently produces no accumulation of charge. Hence the change of charge density in the $p^+$ layer of zone 61 consists simply of a decay of the charge $\delta Q(t)$ at $x_l$ at a rate $$d\delta Q/dt=-\delta J=-(\sigma/K)\delta Q \quad (3.9)$$

leading to a solution $$\delta Q(t)=\delta Q_0 \exp(-\sigma t/K) \quad (3.10)$$

The quantity $$K/\sigma=K/\mu\rho \quad (3.11)$$

is the dielectric relaxation time. For germanium with $\sigma=10^3$ mho/cm. and $\kappa=16$, we have $$K=1.41 \times 10^{-12} \text{ farad/cm.} \quad (3.12)$$

and $$K/\sigma=1.4 \times 10^{-15} \text{ sec.} \quad (3.13)$$

This time is much shorter than most of the other times considered.

We may apply the reasoning of Section 1 to the decay of voltage across the $p^+$ layers. The voltage is initially $$EW_p=\delta Q_0 W_p/K \quad (3.14)$$

where $W_p$ is the sum of the widths of the two $p^+$ layers 61 and 62. The value of $D(t)$ is thus $$D(t)=(W_p/K)\exp(-\sigma t/K) \quad (3.15)$$

and $$\int_0^\infty D(t)dt=W_p/\sigma \quad (3.16)$$

This is the correct expression for the series resistance of the two $p^+$ layers and shows that relaxation effects in them are unimportant except at extremely high frequencies.

In general the resistivity of the $\nu$-region will be much greater than that of the $p^+$ layers. Under operating conditions it may have a conductivity due to injected holes larger than its normal conductivity (a topic we shall discuss more fully below), but even this will still leave it with much less conductivity than the $p^+$ layers. As a result, the current in the $\nu$-region induced by $\delta E=\delta Q/K$ will be much less than that in the $p^+$ layers and almost no charge will flow into it during the time that $\delta Q$ on the surface decays to zero. As a result, the change in the first $10^{-14}$ second in $\delta\rho$ and $\delta E$ will be as shown in Figs. 17 and 18.

Figs. 17 and 18 show successive instants of time, with time advancing from top to bottom and corresponding states for $\delta\rho$ and $\delta E$ shown horizontally. It represents the inward shift of $+\delta Q_0$ and $-\delta Q_0$ to the boundaries of the $\nu$ layer 63, with no accumulation of charge within the $p^+$ layers in the process. The transient voltage drop is the area under the $\delta E$ curve.

C. A hypothetical illustration

We shall next discuss the drop in voltage across the $\nu$-region on the basis of a much simplified picture of the hole flow. For this purpose we shall assume that hole flow into the region is extremely sensitive to the field. Thus we shall suppose that the current flowing over the maximum in Figure 19 is of the form $$\delta J=\sigma_m\delta E \quad (3.17)$$

the interpretation of $\sigma_m$ in terms of the situation at the potential maximum being given later.

From this assumption we can derive an expression for the decay of $\delta E$ as follows: From 3.6 we have the result $$K\delta E(x,t)=\int_{x_l}^{x}\delta\rho dx\equiv\delta Q(x_l,x) \quad (3.18)$$

The rate of change of charge per unit area between $x_l$ and $x$ is the current at $x_1$, which is J, minus the current at $x$ which is $J+\delta J$. Hence $$K(\partial/\partial t)\delta E(x,t)=-\delta J \quad (3.19)$$

Hence for $\delta E$ at the maximum we have $$\frac{d}{dt}\delta E=-(\sigma_m/K)\delta E \quad (3.20)$$

Hence $\delta E$ decays with a relaxation time of $K/\sigma_m$ where $\sigma_m$ is a sort of conductivity at the potential maximum in the $\nu$-region defined by Equation 3.17. In a following section, we shall show that a good approximation for $\sigma_m$ is simply $\mu\rho_m$ where $\rho_m$ is the hole charge density at the maximum.

We shall assume that $K/\sigma_m$ is much less than the transit time of a hole across the $\nu$-region. Consequently, the pulse of holes, brought past the maximum by the process just discussed, will be relatively narrow compared to the width of the $\nu$-region. Behind this pulse, the field will have its normal value so that $\delta E=0$, and ahead of it will be approximately $$\delta E=\delta Q_0/K \quad (3.21)$$

The position of the pulse, the distribution of $\delta E$ and of the transient voltage $\delta V$ (which is $\delta Q_0 D(t)$ by definition)

$$\delta V=-\int_{x_l}^{x}\delta E dx \quad (3.22)$$

as functions of time at approximately equal time intervals are represented in Figs. 20, 21, and 22. Due to the curvature of the potential distribution, illustrated in Fig. 19, the drift velocity of the hole pulse increases continuously, a feature represented on Fig. 20 by the progressively increasing advances of pulse position between one instant and the next. As a consequence of this accelerated motion, the rate of decrease of area in Fig. 21 increases with time. Hence the rate of decrease of voltage and of $D(t)$ increases with advancing time as shown in Figs. 22 and 23. As a consequence, the $D(t)$ curve of Fig. 23 has the desired convex upward shape that results in negative resistance at the proper frequency.

D. The effect of holes in the $\nu$-region

We shall next consider how the steady state density $\rho$ of holes in the $\nu$-region influences the behavior of the transient field δE. We shall consider the situation to the right of the maximum in the V(x) curve of Fig. 19. It can be shown that as soon as a point at a potential $kT/q$ below the maximum is reached as shown at +L on Fig. 19, the current is carried chiefly by drift, the effect of diffusion being relatively small.

We shall accordingly consider an initial condition shortly after the time $K/\sigma_m$ such that the hole pulse has moved forward to the point where it is being carried chiefly by drift. Under these conditions the electric field δE(x,t) has its initial value $$\delta E_0 = \delta Q_0/K \quad (3.23)$$

for x values greater than that for the pulse of holes. We shall next examine how δE(x,t) varies with time.

For this purpose we shall introduce the drift velocity under steady state conditions:

Drift velocity$\equiv v(x)$

This drift velocity is simply $\mu E$ for low electric fields where $\mu$ is the mobility. At high fields, $v$ is not proportional to E and may be written as $v(e)$. We shall generalize the definition of the mobility by introducing $$\mu^*(x) = dv(e)/dE \quad (3.24)$$

where the derivative is evaluated for the field E(x).

The relationship between the electric field in a semiconductor and the drift velocity of charge carriers is illustrated in Fig. 24. The curve sets forth the results of tests of the electron current in a specimen of n-type germanium of 2.7 ohm-cm. resistivity at temperatures of 77° K., 193° K., and 298° K.; however, in general, its form is typical of electronic semiconductors. It will be noted that at low fields the characteristic is a straight line having a 45 degree slope indicating a constant value of mobility. At higher fields a non-linear relationship between drift velocity and field is evident, in the intermediate field intensities $\mu$ is proportional to $E^{-1/2}$, and at higher fields a saturation region develops and $\mu$ is substantially independent of E.

As we shall show, it is most convenient to describe the variation of δE in respect to a moving system of coordinates. For this purpose we consider an imaginary family of planes perpendicular to the axis. We imagine that each of these planes moves with the steady state velocity v(x) corresponding to its position. Under steady state conditions, therefore, each plane moves through the ν-region just as would a plane of holes.

Under transient conditions, the imaginary planes are defined so as to move with the steady state velocity v. We shall next imagine that we move through the ν-region with one of these planes and study how δE at the position of this moving plane varies with time. Now we have shown that δE is (1/K) times the excess charge above the steady state value per unit area between the left edge of the unit and the plane at x. Let us consider two positions of the plane being studied, x and $x+v(x)dt$. These two positions are represented on Fig. 25. Also represented on the figure are the curves for δE(x,t) versus x for the two instants of time. We shall be concerned with three values of δE:

$$\delta E_1 = \delta E(x,t) \quad (3.25a)$$
$$\delta E_2 = \delta E(x+v,dt,t) \quad (3.25b)$$
$$\delta E_3 = \delta E(x+v,dt,t+dt) \quad (3.25c)$$

During time dt the change in δE as we move with the plane with velocity v is denoted by DδE and is evidently $$D\delta E = \delta E_3 - \delta E_1 \quad (3.26)$$

We shall evaluate this by finding first $\delta E_2 - \delta E_1$ and second $\delta E_3 - \delta E_2$ and then adding the two together. Since $\delta E_1$ and $\delta E_2$ are simultaneous values, their difference is equal to (1/K) times the transient charge between the two positions of the plane. This leads to $$\delta E_2 - \delta E_1 = \delta \rho v_0 dt/K \quad (3.27)$$

as indicated on Fig. 25.

The values $\delta E_3$ and $\delta E_2$ are evaluated at the same position but with a time difference dt; hence their difference is (1/K) times the transient charge passing the plane. This leads to $$\delta E_3 - \delta E_2 = -\delta J dt/K \quad (3.28)$$

The transient current δJ is the difference between the instantaneous current and $J_0$ so that $$\delta J = (\rho+\delta\rho)(v+\delta v) - \rho v \quad (3.29)$$
$$= v\delta\rho + \rho\mu^*\delta E$$

up to linear terms in the transient quantities. Combining these results leads to $$D\delta E = -\rho\mu^* \delta E dt/K \quad (3.30)$$

Hence the rate of change of δE as observed on the plane moving with speed v(x) is $$\frac{D\delta E}{Dt} = -\frac{\mu^* \rho \delta E}{K} \quad (3.31)$$

where the D notation implies total derivative in the moving plane. This equation shows that δE decays at the same rate as it would in material of conductivity $\mu^*\rho$ provided we measure it on a plane moving with velocity v(x).

Since in time dt, the plane advances a distance $dx=vdt$, the change in the logarithm of δE, evaluated on the moving plane, may be written as $$D(ln\delta E) = (D\delta E)/\delta E = -\mu^* \rho dx/v \quad (3.32)$$

In this form, the total derivative expression shows that the decay factor for δE in traversing the interval from x to $x+dx$ is always the same, no matter what the value of δE is and no matter how the transient charge that produces it is distributed. This expression may at once be integrated and leads to the conclusion that the ratio of δE values at positions $x_1$ and $x_2$ for the moving plane is $$\delta E(x_2)/\delta E(x_1) = \exp - \int_{x_1}^{x_2} \mu^* \rho dx/vK = \exp - \int_{t_1}^{t_2} \mu^* \rho dt/K$$

$$(3.33)$$

It should be noted that $\mu^*\rho$, which occurs in the decay expression, is a sort of "differential conductivity" in the following sense. Consider a specimen of uniform hole density $\rho$ and uniform electric field E. The current density would be $J=\rho v$. Now suppose the electric field is increased by dE; then the current density will increase by dJ where $dJ/dE=\mu^*\rho$ and $\mu^*$ is the derivative defined in Equation 3.24.

The use of the total derivative method to evaluate the decay of the δE distribution is represented in Fig. 26. In this figure $x_0$ represents the position of the pulse of holes just as it enters the region where its motion is governed by drift in the electric field. The right hand edge of the ν-region is at $x_4$. The positions $x_1$, $x_2$ and $x_3$ are defined in terms of fractions of $t_4$, the transit time from $x_0$ to $x_4$: $x_1$ is the position reached in one fourth of the transit from $x_0$ to $x_4$, $x_2$ is at one half the transit time and $x_3$ at three fourths. Thus if we imagine that four geometrical planes a, b, c and d start at $x_0$, $x_1$, $x_2$ and $x_3$ at $t=0$ and move through the structure with velocity v(x), then at one fourth the transit time, denoted by $t_1$, a will be at $x_1$, b at $x_2$, c at $x_3$ and d at $x_4$. At one half transit time, denoted by $t_2$ a will be at $x_2$, b at $x_3$ and c at $x_4$; d need not be considered since it left the ν-region when it passed $x_4$. Similar statements apply to $t_3$ and $t_4$.

In terms of these definitions the course of the decay of δE can be conveniently visualized. If we neglect the time for relaxation of the $p^+$ layers 61 and 62 then at $t=0$, δE has its initial value $\delta E_0$ throughout the ν-region and the pulse of holes is at $x_0$, a situation represented in Figs. 26 and 27. During the interval between 0 and $t_1$, plane a advances at velocity v(x) from $x_0$ to $x_1$ and the value of $\delta E(a,x)$ measured on the moving plane decays by a factor $$f_{01} = \exp - \int_{x_0}^{x_1} \mu^* \rho dx / Kv \qquad (3.34)$$

so that we may write $$\delta E(a,x_1) = f_{01} \delta E_0 \qquad (3.35)$$

During the same time interval, planes $b$, $c$, and $d$ advance to their next positions and decay by factors $f_{12}$, $f_{23}$, $f_{34}$. The values of $\delta E$ at the five positions at time $t_1$ are, therefor, 0 for $x_0$ since the hole pulse has passed by, and $\delta E_0$ times the factors $f_{01}$, $f_{12}$, $f_{23}$ and $f_{34}$ respectively for positions $x_1$ to $x_4$.

The values of $\delta E$ at instant $t_2$ are similarly obtained by considering the effects of the additional decays as plane $a$ moves from $x_1$ to $x_2$ etc. As discussed above the decay factors for each interval of $x$ will be the same as before. Applying this reasoning to plane $a$ for all four intervals of time leads to the conclusion that the values of $\delta E$ for it are:

$\delta E_0$ at $t=0$ with $a$ at $x_0$
$\delta E_0 f_{01}$ at $t=t_1$ with $a$ at $x_1$
$\delta E_0 f_{01} f_{12}$ at $t=t_2$ with $a$ at $x_2$
$\delta E_0 f_{01} f_{12} f_{23}$ at $t=t_3$ with $a$ at $x_3$
$\delta E_0 f_{01} f_{12} f_{23} f_{34}$ at $t=t_4$ with $a$ at $x_4$ The course of decay of $\delta E$ on plane $a$ is indicated by the dashed line $a$ of Fig. 26.

The decay line for $\delta E$ on plane $b$ is of the same form as that for $a$ except that at each value of $x$ it is larger by a factor $1/f_{01}$, since it does not undergo the decay of the interval from $x_0$ to $x_1$. Similar statements apply to planes $c$ and $d$ and the dashed lines for them are larger than that for plane $a$ by factors $(f_{01}f_{12})^{-1}$ and $(f_{01}f_{12}f_{23})^{-1}$ respectively.

The solid curves for $\delta E(x,t)$ for the five instants are thus obtained by constructing the decay curves for the four planes and then drawing the $\delta E$ curves through simultaneous points on each decay line.

The transient hole densities corresponding to the $\delta E$ curves of Fig. 26 are represented in Fig. 27 the infinitely sharp pulse of holes being represented by a narrow area. Due to the neglected effect of diffusion, the pulse will actually be spread out somewhat. It is to be noted that, unlike the case of the $p^+$ layers, a hole density tends to build up in intermediate portions of the $\nu$-region. The hole density is given from the $\delta E$ curves by applying Poisson's equation $$\delta \rho = K \partial \delta E / \partial x \qquad (3.36)$$

The origin of the hole accumulation can be understood in terms of the dependence of differential conductivity on $x$. Since E increases to the right in the $\nu$-region, $\rho$ decreases with increasing $x$ and, if E becomes large enough, $\mu^*$ also decreases. Hence at $t=0$, when $\delta E = \delta E_0$ throughout the $\nu$-region $$\delta J = \mu^* \rho \delta E_0 \qquad (3.37)$$

will be a decreasing function of $x$. Hence the current flow across $x_3$ will be greater than across $x_2$ and holes will tend to accumulate between the two planes. This effect leads to the development of a transient hole density throughout the $\nu$-region in advance of the pulse of holes.

The value of $D(t)$ at each instant is simply the area under the $\delta E$ curve. It is evident that the desired convex upward shape for $D(t)$ will correspond to a slow initial rate of decrease of area followed by a rapid final decrease. A large decay factor for the advancing planes will tend to produce a rapid initial decrease of area and may prevent the obtaining of negative resistance. Hence it will be desirable in general to have a small decay factor for a large portion of the $\nu$-region. A structure having convergent current flow as produced by a geometry to be discussed below has this desired small decay factor.

3. THE DECAY OF $\delta Q$ TO THE LEFT OF THE POTENTIAL MAXIMUM

In Section 2 we assumed that after the relaxation of the $p^+$ layer, the charge $\delta Q$ passes over the potential maximum and into the field region at a rate described by the equation $$d\delta Q_m/dt = -\delta J = -\sigma_m \delta E$$
$$= -(\sigma_m/K)\delta Q_m \qquad (4.1)$$

where $\delta Q_m$ is the charge to the left of the maximum. In this section we shall discuss this relationship somewhat more fully and shall describe conclusions reached by analytical methods presented elsewhere.

In Figures 13, 14 and 31 we represent a typical situation in which the charge $\delta Q_0$ will initially be collected to the left of the potential energy maximum for holes. The charge $\delta Q_0$ will be distributed in the form of $\delta \rho$ and will initially set up a field at the potential maximum equal to $\delta Q_0/K$. At the moment when this field first appears, there will have been no change in the charge distribution at the potential maximum and, consequently, the added current will be simply $$\delta J_m(t=0) = \mu \rho_m \delta E \qquad (4.2)$$

where $\rho_m$ is the steady state charge density at the maximum. If this rate of decay persisted, it would lead to the result expressed in Formula 4.1 with the local conductivity at the potential maximum appearing for $\sigma_m$.

The above preliminary discussion shows that two questions arise in connection with equating $\sigma_m$ and the quantity $\mu \rho_m$. For the purposes of the previous section we are interested not in the decay of charge at the potential maximum but instead with the rate at which this charge appears in the region where it is moved by the electric field. At the potential maximum the flow is, of course, due to the diffusion rather than to the electric field. At a distance where $x=x_L$ to the right of the maximum such that the potential drop is equal to $kT/q$, the electric current is carried predominantly by the field rather than by diffusion. Therefore, one question which must be answered is as follows:

(1) Is the rate of decay of the electric field at the place where electric field dominates the flow the same as the rate at the potential maximum?

The second question has to do with the rate of decay. Although Equation 4.2 gives correctly the initial rate of decay, further consideration is necessary to show that the subsequent rate of decay is substantially exponential with the time constant given by Equation 4.1. This leads to the second question:

(2) Does Equation 4.1 adequately describe the entire decay process?

The answer to both of these questions is found to be affirmative on the basis of quantitative analytical considerations of the forms of the currents involved. In these considerations two general situations can be distinguished. One of these corresponds to Figure 13 and for it the potential distribution in the $\nu$-region is due chiefly to donor ions rather than to the holes themselves. Under these conditions the added holes will accumulate at an appreciable distance to the left of the potential maximum and at an energy below the maximum equal to several times thermal energy. A hole in this region will move under the influence of thermal agitation and will eventually acquire sufficient energy to climb the potential maximum. On the average, however, a hole will climb part way up the hill many times before escaping over the top. This behavior leads to situations very similar to thermal equilibrium to the left of the maximum, and consequently the number of holes climbing over the maximum depends upon the potential rise over which they must climb. This rise is reduced by the additional electric field $\delta E$ due to the added holes. For linear theory, the increase in current climbing the top of the hill is directly proportional to $\delta E$. Consequently, the rate of decay of the charge will be directly proportional to the charge and a pure exponential decay will result. The decay constant will not be exactly that given by writing $$\sigma_m = \mu \rho_m \qquad (4.3)$$

but may be somewhat greater depending upon the exact details of the potential distribution. For purposes of estimating relative orders of magnitude, however, Equation 4.3 is satisfactory for most purposes.

For the case just considered it is evident that the answer to question (1) is that the decay at position $x_L$ is substantially the same as at the maximum. The reason for this is that the transit time to the right of the maximum will be small compared to the relaxation time deduced from Equation 4.3. Consequently, there will be no tendency for holes escaping over the maximum to accumulate between the maximum and $x_L$, and consequently, the relaxation beyond $x_L$ will be the same as for the maximum itself.

The other extreme case is one in which the charge density is produced predominantly by the holes themselves. This is the case of space charge limited emission. For this case, the added holes are present practically at the maximum itself. The analytical treatment for this case shows that two possible methods of calculating the relaxation time are practically equivalent. One of these consists of calculating the length of time required for a hole to diffuse from the maximum to a distance at which the electric field dominates the flow process. Another calculation consists of evaluating the relaxation time based on equation 4.3 for this case. It is found that both of these procedures lead to essentially the same answer. It is also possible to show that the relaxation time at a distance to the right of the maximum corresponding to $x_L$ in Fig. 28 is substantially the same as these other two times.

For many purposes the requirement on the relaxation time at the maximum is simply that it be very short compared to transit time through the $\nu$-region. The calculations just discussed, therefore, may be used to estimate this time and to determine the condition which will make it small compared to the transit time. For this purpose the approximate results presented above are adequate.

4. AN ANALYSIS FOR A $p^+ \nu p^+$ STRUCTURE

A. *Formula for $D(t)$*

In Section 2 we introduced the notation $$f_{12} \equiv f(x_1, x_2) \qquad (5.1)$$

where this function of $x_1$ and $x_2$ represents the decay in the transient electric field as observed on a moving plane as it travels from position $x_1$ to $x_2$. The equation derived in that section for this decay can be written in the form $$\ln f(x_1, x_2) = -\int (\mu^* \rho / K) dt \qquad (5.2)$$

The integral over $x$ has been replaced by an integral over $t$ in Equation 5.2 where each interval $dx$ has been transformed to the transit time over the same interval for the moving plane.

It is convenient for analytical purposes to introduce a time-like variable functionally related to $x$ in terms of the transit time. We shall denote this variable by $s$; it is defined as follows:

$$s = \int_0^x dx / v(x) \qquad (5.3)$$

where $x=0$ is the position at which the pulse becomes carried by drift. For the Child's law analog dealt with later in this section, $x=0$ is taken as the point at which $E=0$. Decay factors can be equally well expressed as functions of the two positions defined in terms of transit times so that we may write $$\ln f(s_1, s_2) = -\int_{s_1}^{s_2} (\mu^* \rho / K) ds \qquad (5.4)$$

where by $f(s_1, s_2)$ we mean the function that might more correctly be written as $f[x(s_1), x(s_2)]$.

As was described in Section 2, the contribution of any interval $dx$ to the transient voltage across the device is simply $\delta E$ times $dx$. At a time $t$ after the application of charge $\delta Q_0$ the contribution to $\delta V$ due to a small interval $ds$ may be evaluated by the following reasoning: The plane located at $x(s)$ at time $t$ was located at the position corresponding to $s-t$ at the time $\delta Q_0$ was applied. At that time the transient electric field was $\delta E_0$ throughout the structure. Consequently, the value of $\delta E$ at position $s$ and time $t$ will be given by the decay factor from $s-t$ to $s$. This leads to $$dV = \delta E_0 f(s-t, s) v(s) ds \qquad (5.5)$$

for the contribution made by each $ds$ to the transient voltage. If this transient voltage is summed over the range of $s$ for which there is a transient electric field and the result is divided by $\delta Q_0$, then we will obtain the impulsive impedance:

$$D(t) = (1/K) \int_t^T f(s-t, s) v(s) ds \qquad (5.6)$$

where T is the transit time through the $\nu$-region. We shall use this expression in order to evaluate the impulsive impedance in later parts of this section.

B. *Linear approximation to $p^+ \nu p^+$, steady state*

We shall next derive expressions for the steady state currents in a $p^+ \nu p^+$ structure assuming that the electric fields are small enough so that the drift velocity may be taken to be linear in the electric field. This permits us to write $$\mu^*(x) = \mu, \quad v = \mu E \qquad (5.7)$$

where $\mu$ is the mobility at zero electric field. The corresponding expressions for current and charge density are $$J = \mu \rho E, \quad \rho = J / \mu E \qquad (5.8)$$

In the treatment presented in this section, we shall use the Child's law analog at the point where the electric field goes to zero and shall consider that the current flow is entirely due to drift. As we have discussed elsewhere, the correction in the potential distribution due to the consideration of diffusion effects near the potential maximum is very small compared to the applied voltages in the operating range for the structures of interest.

The basic equations for this case are Poisson's equation $$K dE/dx = \rho + \rho_f \qquad (5.9)$$

and equation 5.8 relating charge density current and electric field given above. Introducing $\rho$ from Equation 5.8 and expressing $dx$ in terms of $ds$ leads to $$K dE/(J + \mu \rho_f E) = ds \qquad (5.10)$$

This equation may be readily integrated to give $$E = (J/\mu \rho_f)(e^{\alpha s} - 1) \qquad (5.11)$$

where $$\alpha = \mu \rho_f / K \qquad (5.12)$$

It is evident for this equation that the zero point for $s$ corresponds to the potential maximum or point of space charge limited emission since for $s=0$ the electric field E vanishes.

From the functional relationship 5.11 between E and $s$, it is possible to derive by integration the other quantities of interest. The functional dependence of $x$ upon the transit time is given by $$x(t) = \int_0^t \mu E ds = \mu J K (\mu \rho_f)^{-2} (e^{\alpha t} - \alpha t - 1) \qquad (5.13)$$

If the transit time through the $\nu$-region is $$T_t = \text{transit time} \qquad (5.14)$$

and the thickness is W, then we can write $$W = x(T_t) = (JK/\mu \rho_f^2)(e^\beta - \beta - 1) \qquad (5.15)$$

where $$\beta = \alpha T_t \qquad (5.16)$$

The steady state voltage across the $\nu$-region is given by $$V_b = \int_0^{T_t} E v \, ds = (J^2 K/\mu^2 \rho_f^3)\left(\frac{1}{2}e^{2\beta} - 2e^\beta + \beta + \frac{3}{2}\right) \qquad (5.17)$$

For small densities of donors and acceptors or for very thin $\nu$-regions the space charge will be determined largely by the moving holes. For this case the solution should correspond to the Child's law analog. This case corresponds to $\beta \ll 1$ and we have $$W = (JK/\mu \rho_f^2)(\beta^2/2) = JT_t^2 \mu/2K \qquad (5.18)$$

$$V_b = (J^2 K/\mu^2 \rho_f^3)(\beta^3/3) = J^2 T_t^3 \mu/3K^2 \qquad (5.19)$$

If T is eliminated from these equations, we obtain $$J = 9\mu K V^2/8W^3 \qquad (5.20)$$

the correct relationship between current, voltage, and thickness for the Child's law analog. If J is eliminated, we obtain $$T_t = 4W^2/3\mu V \qquad (5.21)$$

the correct relationship for transit time, thickness and voltage.

It is advantageous to consider certain reduced values for voltage and current density. The reduced voltage is that required to cause space charge to penetrate a layer of the $\nu$-region containing fixed carriers only of thickness W when the charge density is $\rho_f$. This voltage is $$V_t = \rho_f W^2/2K \qquad (5.22)$$

If Equation 5.15 is used to eliminate J from Equation 5.17, then it is found V can be written in terms of this reduced voltage as follows:

$$V_b = V_f(e^{2\beta} - 4e^\beta + 2\beta + 3)(e^\beta - \beta - 1)^{-2} \qquad (5.23)$$

The convenient parameter for current corresponds to the current that would be drawn by the Child's law analog if $V_t$ were applied and no donor or acceptor charge density were present. This current is $$J_f = 9\mu K V_f^2/8W^3 \qquad (5.24)$$

In terms of Equations 5.24 and 5.22 it is possible to solve Equation 5.15 for the current in the form $$J = (32 J_f/9)(e^\beta - \beta - 1)^{-1} \qquad (5.25)$$

Equations 5.25 and 5.23 may be used to express the functional relationship between $V_b$ and J. This is done by plotting one quantity against the other with $\beta$ as a parameter. The behavior for two limiting conditions is particularly important:

$$\beta \to \infty, \quad V_b \to V_f, \quad J \to 0 \qquad (5.26)$$

for this case, the current approaches zero and the voltage approaches the limiting value required to make the space charge penetrate the structure. If diffusion were considered, a slightly different result would be obtained, and as J approaches zero $V_b$ would drop below $V_f$, the reason being that even for $V_b$ less than $V_f$ a certain number of holes will be able to diffuse over the potential maximum and will produce a finite current. The other limiting condition corresponds to complete space charge limitation and may be written as $$\beta \to 0, \quad V_b \to V_f 8/3\beta, \quad J \to J_f 64/9\beta^2 \qquad (5.27)$$

This relationship leads to $$J/V_b^2 = J_f/V_f^2 \qquad (5.28)$$

which shows that for this condition J and $V_b$ are related as they should be for the Child's law analog.

In Fig. 32 the relationship between current and voltage is shown with values of $\beta$ given as a parameter. It is seen that for voltages four or more times as large as $V_f$ the current-voltage relationship is well approximated by the Child's law analog. We shall later lay emphasis upon the case of $\beta = 3$. For this case the voltage is 30 percent larger than that necessary to penetrate the $\nu$-region. The corresponding current is about one-eighth of that for the Child's law analog.

C. Transient solution for $p^+\nu p^+$

We shall now apply the result obtained for the steady state condition in order to calculate the impulsive impedance. For this purpose, we need the steady state hole density which is readily found to be $$p = J/\mu E = \rho_f (e^{\alpha s} - 1)^{-1} \qquad (5.29)$$

This quantity may at once be inserted into the expression for the decay of the transient electric field between positions corresponding to transit times, $t_1$ and $t_2$; the result is $$\ln f(t_1, t_2) = -\int_{t_1}^{t_2} \mu \rho \, ds/K$$

$$= -\int_{t_1}^{t_2} (e^{\alpha s} - 1)^{-1} \alpha \, ds$$

$$= \ln(1 - e^{-\alpha t_1})/(1 - e^{-\alpha t_2}) \qquad (5.30)$$

In order to evaluate the impulsive impedance it is necessary to integrate over the decay factor given in Equation 5.30 weighting each interval of transit time $ds$ by the interval of length corresponding to it. This leads to $$v \, ds = \mu E \, ds = (JK/\mu \rho_t^2)(e^{\alpha s} - 1) \alpha \, ds \qquad (5.31)$$

In terms of these relationships we may obtain the impulsive impedance:

$$D(t) = (J/\mu \rho_f^2) \int_t^{T_t} (e^{\alpha s} - e^{\alpha t}) \alpha \, ds$$

$$= (J/\mu \rho_f^2)[e^\beta + e^{\alpha t}(\alpha t - \beta - 1)]$$

$$\equiv (J/\mu \rho_f^2) D(\beta, \alpha t) \qquad (5.32)$$

It is instructive to note that this expression reduces correctly as it should for $t = 0$ to the capacity of the $\nu$-region:

$$D(\beta, 0) = (J/\mu \rho_f^2)(e^\beta - \beta - 1) = W/K \qquad (5.33)$$

where Equation 5.15 has been used to introduce W.

For small values of $\beta$ Equation 5.32 reduces to the expression corresponding to Child's law. For this case the $D(t)$ curve has a concave upward shape throughout and is in fact a parabola tangent to the $t$-axis at the transit time. For large values of $\beta$ it may be seen from inspection of Equation 5.32 that the desired convex upward shape will be obtained. This can be seen by noting that for large values of $\beta$ the exponential term in $\beta$ dominates the expression until $t$ is practically equal to the transit time. Consequently, D will be large and nearly constant until the transit time is approached closely. In Fig. 33 the behavior of $D(\beta, t)$ is shown as a function of $t$ with $\beta$ as a parameter. It is seen that for values of $\beta$ equal to 3 or larger, a decidedly convex behavior is obtained. If the criteria of the end of Section 1 are applied to the curves for $\beta = 3$ or 4, it is concluded that negative resistances will be obtained at frequencies whose period is equal to the transit time.

It is possible to integrate the analytical expression for the impulsive impedance in order to evaluate the impedance as a function of frequency. The procedure is as follows:

$$Z(\omega) = \int_0^{T_t} e^{-i\omega t} D(t) \, dt$$

$$= (KJ/\mu^2 \rho_f^3) Z(\beta, \theta) \qquad (5.34)$$

$$\theta \equiv \omega T_t \qquad (5.35)$$

$$Z(\beta, \theta) \equiv \frac{e^\beta(e^{-i\theta} - 1)}{-i(\theta/\beta)} - \frac{(e^{\beta - i\theta} - 1)(1 + \beta)}{1 - i(\theta/\beta)} + \frac{e^{\beta - i\theta}(\beta - i\theta - 1) + 1}{[1 - i(\theta/\beta)]^2}$$

$$(5.36)$$

In the above equations $\theta$ is the "transit angle" through the device at the working frequency, i. e., it is a measure, in radians, of the fraction of a cycle, or number of cycles of alternating current required for the charge carriers to pass from the emitting junction through the space charge region. The dimensionless function $Z(\beta,\theta)$ represents the dependence of the impedance upon frequency for a device operating with a fixed steady state condition.

In Figs. 34 and 35 the quantity $Z(\beta,\theta)$ is shown as a function of $\theta$ with $\beta$ as a parameter. The real part is given in Fig. 34 and the imaginary part in Fig. 35. As was predicted on the basis of inspection of Fig. 33, it is seen that for $\beta=3$ a negative resistance region occurs when $\theta$ is in the neighborhood of $2\pi$ or 360 degrees. Under these conditions the ratio of real to imaginary parts of the impedance is about 1:10. The imaginary part of the impedance is negative corresponding to a capacitative reactance.

It should be noted in this figure that the range of negative resistance lies in the same general range of transit angles mentioned in the introductory treatment of Section 1. In that treatment, transit angles of $\pi$ radians or 180 degrees to 2 radians or 360 degrees were found to give negative resistances. In Fig. 34 the range is about 250 degrees to 480 degrees. On the basis of these examples negative resistances are expected to appear in a range between 180 degrees and 540 degrees or ½ to ¾ cycles. As Fig. 34 shows, negative resistances may also occur at transit angles larger by 360 degrees or multiples thereof. These negative resistances are less pronounced and will not arise unless a negative resistance occurs in the range of ½ to ¾ cycles.

It is convenient in calculating numerical values to compare the impedance with the $$\text{Steady state resistance} \equiv V_b/J \quad (5.37)$$

Combining Equations 5.37, 5.34 and 5.17 leads to $$Z=(V_b/J)Z(\beta,\theta)(\tfrac{1}{2}e^{2\beta}-e^\beta+\beta+\tfrac{3}{2})^{-1} \quad (5.38)$$

We shall use this equation in Section 6 in treating a specific numerical design.

5. DECAY OF SPACE CHARGE BEHIND THE MAXIMUM

In this section the decay of space charge behind the maximum, discussed qualitatively in Section 2, will be analyzed in more detail.

A. Case of $\rho_f \gg \rho_m$

If the space charge due to donors in the $\nu$-region is $\rho_f$ and that due to holes at the maximum $\rho_m$ and $$\rho_f \gg \rho_m \quad (6.1)$$

then the potential near the maximum, represented at $x=0$ in Fig. 28 may be written as $$V(x)=V_m-(KT/q)(x/L)^2 \quad (6.2)$$

$$L=(2KkT/q\rho_f)^{1/2} \quad (6.3)$$

where $x=0$ is the maximum. The current over the maximum is approximately $$J=\rho_m D/L \quad (6.4)$$

and the hole density to the left of the maximum for $x<-L$ is very nearly given by $$\rho(x)=2\rho_m \exp(x/L)^2 \quad (6.5)$$

Now if a disturbing field reaches into the region to the left of the maximum, where the holes are substantially in equilibrium, it will penetrate approximately one Debye length. In this case the Debye length decreases as $x$ becomes negative and is given by $$L(x)=L_m \exp(-(x/L)^2/2) \quad (6.6a)$$

where $$L_m=(KkT/2q\rho_m)^{1/2} \quad (6.6b)$$

Evidently the added holes will be present at the place where the penetrating field is being attenuated.

The field will penetrate beyond the maximum approximately to a depth A (position $x=-A$) such that the Debye length is equal to A. Evidently it can penetrate that far since for $-A<x<0$, the Debye length is greater than A so that penetration can occur. It can penetrate very little deeper than A since the Debye length decreases very rapidly for $x<-A$. Hence the added charge is located approximately at $x=<-A$.

The equation for A is thus $$A=L(A)=L_m \exp(-(A/L)^2/2) \quad (6.7)$$

or $$L_m/L=(\rho_f/4\rho_m)^{1/2}$$
$$=(A/L)\exp((A/L)^{2/2}) \quad (6.8)$$

For the case considered, $\rho_f$ is much greater than $\rho_m$. Hence A will be greater than L. However, A will not be larger than 3 or 4 times L unless $\rho_f$ is greater than $10^3\rho_m$.

If the added holes occur in $$x=-A=-BL \quad (6.9)$$

where B is less than 4, then the change of potential at $x=0$ due to the field $\delta E$ will be $$\delta V=-\delta EA=\delta QBL/K \quad (6.10)$$

and since the current over the maximum varies as $\exp(-qV_m/kT)$, the increase in current will be $$\delta J=(-q\delta V/kT)J=B\mu\rho_m\delta Q/K \quad (6.11)$$

from which it follows that $\sigma_m$ of Section 3 is given by $$\sigma_m=B\mu\rho_m \quad (6.12)$$

as was asserted in Section 2.

B. The case of $\rho_f=0$

If the structure is $p^+Ip^+$ rather than $p^+\nu p^+$, the charge density of holes produces a maximum potential that limits the hole emission. The equations governing this case are $$KdE/dx=\rho \quad (6.13)$$
$$J=-Dd\rho/dx+\mu\rho E \quad (6.14)$$

Substituting $\rho$ from the first equation into the second and integrating gives $$Jx=-KDdE/dx+(\tfrac{1}{2})K\mu E^2 \quad (6.15)$$

If distance, potential, electric field and charge density are measured in the following units $$L_r=(\eta D/J)^{1/3} \quad (6.16)$$
$$V_r=kT/q \quad (6.17)$$
$$E_r=kT/qLr \quad (6.18)$$
$$\rho_r=(J/D)^{2/3}\eta^{1/3}=KE_r/L_r \quad (6.19)$$

where $$\eta=KkT/q(\tfrac{1}{2}) \quad (6.20)$$

then the differential equation becomes $$dy/dz-(\tfrac{1}{2})y^2+2=0 \quad (6.21)$$

where $$y=E/E_r \quad (6.22)$$
$$z=x/L_r \quad (6.23)$$

This Equation 6.21 has a solution which has the correct approach to the Child's law analog for large positive values $z$. We shall denote this solution by $E_s(z)$, where for large positive $z$ $$E_s(z) \rightarrow (2z)^{1/2} \quad (6.24)$$

The corresponding electrostatic potential is $$E_s(z)=-\int_0^z E_s(z)dz \quad (6.25)$$

The charge density corresponding to $E_s$ is $$\rho_s=dE_s(z)/dz \quad (6.26)$$

where the relationship between $\rho$ and $\rho_s$ is $$\rho=\rho_r\rho_s \quad (6.27)$$

In Fig. 29, $E_s$ and $V_s$ are plotted as functions of $z$. The value of $\rho_s$ may be determined from the slope of the $E_s$ curve. The analytic expressions are given in terms of the variables $$u \equiv -z \quad (6.28)$$
$$v \equiv (\tfrac{2}{3})(x^3/2)^{1/2} \quad (6.29)$$
$$w \equiv (\tfrac{2}{3})(u^3/2)^{1/2} \quad (6.30)$$

and Bessel functions K, Y and J and the $\Gamma$ function. For $z>0$.

$$E_s = (6v)^{1/3}\left(\frac{K_{4/3}(v)}{K_{1/3}(v)} - \frac{2}{3v}\right) \quad (6.31)$$

$$V_s = 2ln\left(\frac{3^{1/2}\Gamma(2/3)}{2^{1/3}\pi}v^{1/2}K_{1/3}(v)\right) \quad (6.32)$$

and for $z<0$ $$E_s = -(6w)^{1/3}\left(\frac{Y_{4/3}(w) - 3^{1/2}J_{4/3}(w)}{Y_{1/3}(w) - 3^{1/2}J_{1/3}(w)} - \frac{2}{3w}\right) \quad (6.33)$$

$$V_s = 2ln\left(\frac{3^{1/2}\Gamma(2/3)}{2^{4/3}}w^{1/3}[3^{1/2}J_{1/3}(w) - Y_{1/3}(w)]\right) \quad (6.34)$$

For $x=0$, the limiting value of $E_s$ is $$E_s(0) = (\tfrac{2}{3})^{2/3}\Gamma(\tfrac{2}{3})\Gamma(\tfrac{4}{3}) \quad (6.35)$$

and $V_s$ is, of course, zero. It is seen in Fig. 30 that the drop from the maximum becomes very steep at a little beyond one unit to the left of the maximum. From this it follows that the potential maximum in the I-region is never more than about $L_r$ away from the $p^+$ layer no matter how high the value of $\rho$ in the $p^+$ layer. At $L_r$, or one unit of $z$, to the right of the maximum, the value of $E_s$ is approximately 1 and E is approximately $E_r$. The value of $\rho_m$ at the maximum is almost exactly $\rho_r$, and is somewhat more than $0.7\rho_r$ at one unit to the right of the maximum.

On the basis of these conclusions, the potential distribution in the I-region for currents of J and $J+\delta J$ are shown in Fig. 30. At $x_0$ most of the current flows by drift in both cases. The charge to the left of $x_0$ differs in the two cases by $$\delta Q = \delta E(x_0) \quad (6.36)$$

Two factor contribute to the difference in $\delta E$. At the corresponding points one unit of $z$ from the maximum on the two curves, the difference in E is simply $$\delta E_r = E_r(d ln E_r/d ln J)\delta ln J$$
$$= E_r(\tfrac{1}{3})(\delta J/J) \quad (6.37)$$

However, $E(x_0)$ for $J+\delta J$ is evaluated $\delta x$ farther out than $E_r$ and is thus larger by the field due to the charge in the interval $\delta x$:

$$(0.7\rho_r)\delta x/K = (0.7\rho_r/K)(nL_r/3)(\delta J/J) \quad (6.38)$$

Hence the value of $\delta Q$ is $$\delta Q = E_r(1/3 + 0.7/3)\delta J/J \quad (6.39)$$
$$\cong (E_r/J)\delta J$$

From the relationship that the relaxation time is $\delta Q/\delta J$, it follows that $$\tau = E_r/J = K\mu\rho_m \quad (6.40)$$

This is the conclusion stated in Section 3. The formula for $\tau$ is equivalent to $$\tau = L_r^2/D = L_r/\mu E_r \quad (6.41)$$

These formulae show that $\tau$ is an intuitively natural relaxation time for the space limited emission case and, therefore, it is reasonable to suppose that the charge $\delta Q$ will be set into a state of drift in the field in a time of a few multiples of $\tau$.

6. DESIGN EXAMPLE

As a design example we consider a $p^+$-$\nu$-$p^+$ structure as shown in Fig. 12 in which the $\nu$ material of zone 63 is $n$-type silicon of resistivity of 4000 ohm cm. Taking the mobility of electrons to be 1,250 cm.$^2$/volt sec., this gives a value for $\rho_f$ of $$\rho_f = (4000 \times 1250)^{-1} = 2 \times 10^{-7} \text{ coulomb/cm.}^3 \quad (7.1)$$

The value of $\alpha$ for this fixed charge density is $$\alpha = 250 \times 2 \times 10^{-7}/1.06 \times 10^{-12} \quad (7.2)$$
$$= 4.8 \times 10^7 \text{ sec.}^{-1}$$

where the mobility of holes is taken to be 250 cm.$^2$/volt sec. and the value of K in the centimeter system is $$K = \kappa\epsilon_0 = 12 \times 8.85 \times 10^{-14}$$
$$= 1.06 \times 10^{-12} \text{ farads/cm.} \quad (7.3)$$

If operation with $\beta=3$ is to be used, the transit time is $$T_t = \beta/\alpha = 1/1.6 \times 10^7 \text{ sec.} \quad (7.4)$$

If the operating frequency corresponds to $\theta=2\pi$, then $T_t$ is the reciprocal of the frequency or $f=16$ megacycles/sec. This high frequency can be obtained with a structure $2 \times 10^{-2}$ cm. thick operating at 50 volts.

The voltage required to penetrate a structure $2 \times 10^{-2}$ cm. thick is $$V_f = \rho_f W^2/2K = 2 \times 10^{-7} \times 4 \times 10^{-4}/2.1 \times 10^{-12}$$
$$= 38 \text{ volts} \quad (7.5a)$$

The maximum value of the electric field for $V_b = V_f$ is $$E(max) = 2V_b/W = 3,800 \text{ volts/cm.} \quad (7.5b)$$

This is about half the critical field at which pronounced deviations in the mobility of holes in silicon occur. Operation with $\beta=3$, corresponds to a voltage 1.3 times as large or 50 volts; for this case it will be a good approximation to take $\mu^*$ as equal to $\mu$. The current density for $\beta=3$ is about 0.13 times that for the Child's law analog and is, therefore, $$J = 0.13 \times 9\mu KV_i^2/8W^3$$
$$= \frac{1.2 \times 250 \times 10^{-12} \times 2.5 \times 10^3}{8 \times 8 \times 10^{-6}}$$
$$= 1.2 \times 10^{-2} \text{ amp/cm}^2 \quad (7.6)$$

This current density requires a charge density at the potential maximum $\rho_m$ given approximately by the formula 6.19 for $\rho_r$ $$\rho_m \doteq \rho_r = (J/D)^{2/3}\eta^{1/3}$$
$$= (1.2 \times 10^{-2} \times 40/250)^{2/3}$$
$$\times (2.7 \times 10^{-14})^{1/3}$$
$$= 4.5 \times 10^{-7} \text{ coulomb/cm.}^3 \quad (7.7)$$

This value is about twice $\rho_f$ and shows that at the potential maximum the space charge is due chiefly to the mobile holes so that the neglect of $\rho_f$ in calculating $\rho_m$ is justified. Furthermore, the fact that $\rho_m$ is larger than $\rho_f$ implies that the holes induced by $\delta Q_0$ in calculating $D(t)$ will escape in about ⅙ of the total transit time. This escape is fast enough so that the behavior of $D(t)$ will be substantially the same as for infinitely fast escape and a negative resistance will be obtained for operation with $\beta=3$.

The value of $\rho_m$ is about 30 times larger than the hole density in intrinsic silicon so that the electron density will be strongly suppressed. The parameter $L_r$ is about $3 \times 10^{-4}$ cm. for this case or 60 times less than the thickness of the $\nu$-region. Hence the transient voltage drop across the region to the left of the potential maximum will be unimportant.

The power dissipated by the device will be $$V_bJ = 50 \times 1.2 \times 10^{-2} = 0.6 \text{ watts/cm.}^2 \quad (7.8)$$

This is a power density which can readily be dissipated by conduction cooling.

The impedance for a device of one cm.² area is found from the values quoted for $\beta=3$ and is $$Z(\varpi) = (V_b/J)Z(\beta,\theta)(\tfrac{1}{2}e^{2\beta} - 2e^{\beta} + \beta + 3/2)^{-1}$$
$$= (50/0.012)Z(3,2\pi)(165)^{-1}$$
$$= 4200(-0.9-9i)/165$$
$$= -22.9 - 229i \text{ ohms} \tag{7.9}$$

This impedance is somewhat higher than 180 ohms, the value for a unit area condenser of the same thickness having the dielectric constant of silicon. This shows that the moving holes contribute a capacitative reactance as well as a negative resistance.

From the preceding discussion of the characteristics of the planar diodes, it is evident that it is desirable in producing negative resistance to have the motion of a pulsive charge produce a rapid drop in voltage as it nears the conclusion of its transit through the device. It is possible to enhance this rapid drop by using structures in which the lines of flow of the carriers converge as they progress. The reasons for this enhancement in voltage drop will be appreciated from a consideration of a typical structure embodying a convergent geometry, such as that shown in Fig. 36 wherein the semiconductive body is hemispherical and is composed of an outer highly doped p-type shell 81, coaxially associated with an intrinsic type shell 82 and an inner hemisphere 83 also of highly doped p-type material. Electrode 84 makes an ohmic contact with the outer surface of shell 81 and electrode 85 makes a similar contact to the exposed face of hemisphere 83. The combination is biased so that holes flow from shell 81 across junction 86, through shell 82, across junction 87 and through hemisphere 83 to electrode 85.

Figure 37:
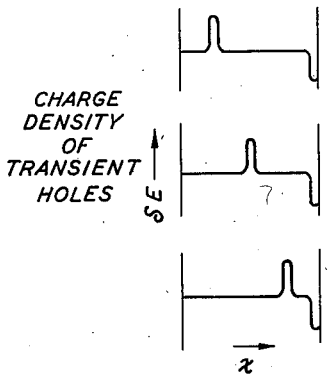

The advantage of the spherical geometry disclosed in Fig. 36 over the planar structure may be readily seen by comparing comparable situations in it and in the situation represented in Figs. 19 through 23 for a planar diode. In the case of the planar diode, it was shown that if a whole pulse moved without attenuation through the planar diode and with accelerated motion, then the desirable convex upwards form for the impulsive impedance was obtained. In the case of the spherical diode, this convex upward form of impulsive impedance results even when the pulse of charge carriers moves with a constant velocity as illustrated in Fig. 37 corresponding to Fig. 20 for the planar diode. For the planar diode this would give a straight line for the impulsive impedance function. The reason for this is that the electric field produced by the pulse of holes is much larger near the collector electrode as may be seen from Fig. 38. Consequently, a major portion of the potential drop disappears during the time interval in which these holes travel a small fraction of their total transit. This accounts for the convex upwards shape for $D(t)$ illustrated in Fig. 39.

A semiconductive element of the form shown in Fig. 36 can be produced, for example, from bulk material having the composition desired in the intermediate zone 82 by using diffusion techniques to form the heavily doped bounding zones 81 and 83. In manufacturing this element the bulk material is formed into a hemisphere and a dimple is formed at the center of its plane face. The outer surface of this form is then converted to the desired conductivity type and depth by diffusion and the converted material on the plane surface removed as by grinding. These conversion techniques can be applied to silicon or germanium for example as discussed in the above-mentioned applications and patents. A conversion of the surface layer to p-type material may be effected by applying a layer of a material containing aluminum or indium or germanium or silicon. Germanium can be converted to n-type by diffusing arsenic, phosphorus or antimony into the surface while a similar conversion of silicon can be achieved with alloys of gold and arsenic or gold and antimony. Since the material near the surface in a body which has been subjected to a diffusion process has a low linear resistance characteristic, pressure contacts having low ohmic resistance characteristics can be made to these surfaces. This results in a structure having two concentric hemispherical surfaces bounding a region of the opposite conductivity type and associated with the external circuit with low resistance ohmic contacts. The advantages of this structure reside in the fact that the emitting electrode or injector has a greater area on the intermediate zone than the collecting electrode so that the carriers advance in an increasing field and produce their major contribution to current in the external circuit near the end of their transit.

Other devices having convergent geometries can be substituted for the form discussed above without a loss of the obvious benefits in negative resistance operation. Two such forms are disclosed in Figs. 40 and 41. A semiconductive wafer 91 having a plane junction 92 between a highly doped zone 98 of one conductivity type and a second zone 95 of high resistance material of the opposite conductivity type can be employed in a structure having a convergent carrier flow as disclosed in Fig. 40. In this instance a hemispherical zone 94 is formed on the upper surface of the wafer by diffusing significant impurities into that surface from a spot of suitable material placed on that surface. A wire 96 is mounted on the low resistance ohmic surface of zone 94 and is employed as the collector lead of the resulting diode. The second electrode can be a large area ohmic contact 97 to the outer surface of zone 98.

Where it is desired to increase the power handling capacity of a device having convergent geometry the cylindrical structure disclosed in Fig. 41 can be utilized. This form of element has two concentric right circular cylindrical surfaces bounding a region of the opposite conductivity type. Again such a structure can be formed by diffusing impurities into a material of the composition desired in the intermediate zone 101 to produce the bounding zones 102 and 103 associated with the injector and collector sections of the diode respectively. A cylindrical blank provided with an axial bore is coated on its interior and exterior with the material supplying the desired impurity and heated to diffuse the impurity. Its ends are then cut or ground to remove the doped material bridging the intermediate zone 101 and to produce an element of the desired length. Metallic electrodes 104 and 105 are then connected to the element on zones 102 and 103.

While it was shown in the discussion of Figs. 32 and 33 that the planar form of device operating within the range of space charge limited emission, that corresponding to Child's law, would not provide negative resistance operation, it is to be understood that there are embodiments of this invention which are operable in the region in which the analog of Child's law applies as high frequency negative resistances. These operative embodiments include any of the geometrics having convergent charge flow shown in Figs. 36, 40 and 41.

As discussed in connection with the effective mobility, the velocity of electrons and holes in semi-conductors is not linearly related to the field they are subjected to at high fields but instead a limiting velocity is approached. In the region of limiting velocity $\mu^*$ approaches zero. Consequently, the decay of a pulse of charge in passing through such a region will be small. In the case of a geometry utilizing a convergent flow of charge the portion through which the pulse of charge initially flows can have an electric field of such magnitude that the linear field-velocity relationship holds and the analog of Child's law applies since the build-up of field in the remaining portion of the path for the change can be to such a value that the drift velocity is substantially constant and $\mu^*$ is zero. This mode of operation provides the necessary convex upwards shape of the impulsive impedance curve even for a device to which the Child's law analog applies.

In Fig. 39 a curve of impulsive impedance against time is shown for the spherical geometry of Fig. 36 wherein the zones 81 and 83 are heavily doped *p*-type material and zone 82 is intrinsic material. If the ratio of the inner and outer diameters of the zone 82 is 1:3 in the exemplary structure, then the relationship of charge carrier velocity to electric field will be approximated by a linear region which extends over about 15 percent of the transit distance followed by a region in which the field exceeds that critical value at which the drift velocity is constant. This second region in which $\mu^*$ is zero extends over the remainder of the transit distance. Thus, the analog of Child's law applies in the linear region; yet a very favorable impulsive impedance characteristic is obtained for this device.

It is to be noted that the convergent geometry is advantageously applicable to structures in which chemical charge densities are present. The effect of a decreasing $\mu^*$ produced by the electric field present in this geometry can be combined with the space charge situation of a *p–n–p* or *n–p–n* planar structure to produce a still more desirable impedance characteristic.

Negative resistances constructed as disclosed above can be associated with circuits of the types employing negative resistances known heretofore. The negative resistance element can comprise, for example, the semiconductive device having the negative resistance characteristics, a biasing means having a suitable magnitude and polarity for negative resistance, and means to isolate the direct current of the element from the remainder of the system while coupling the element to the system at the signal frequencies. Such a combination is disclosed schematically in Fig. 36 wherein direct current source 88 is connected through a choke 40 to electrodes 84 and 85 across the leads of the terminals 89 and is isolated from those terminals by capacitance 90 serially connected in one of the leads intermediate the terminal and the source. It is to be understood that this combination is applicable to other negative resistance geometries.

Combinations of the type shown in Fig. 36 can be employed in negative resistance oscillator structures by associating them with suitable resonating elements. Since the semiconductive element has an inherent capacitive reactance, inductive resonating elements are employed to achieve the oscillations. One form of resonating element providing suitable inductance comprises a resonant cavity associated with the negative resistance by mounting the element within the cavity. A resonant system having negative resistance can be modulated by a signal superimposed on the bias, a sharp tuned circuit exhibiting amplitude modulation while a broad tuning permits frequency modulation.

Another example of a circuit which may utilize the high frequency negative resistances of the present invention is found in the application of W. P. Mason and W. Shockley, Serial No. 302,278, filed August 1, 1952. In that application negative resistance amplifiers are shown comprising combinations of passive non-reciprocal transmission networks, termed "gyrators" in the art, with negative resistance elements. Circuit stability is attained by employing elements having a negative resistance equal to or greater than the positive resistance of the associated circuit by combining these elements with a non-reciprocal circuit unit having directionally asymmetric characteristics, thereby permitting amplification in only one direction of transmission.

While the preceding disclosure has been directed primarily to only a few illustrative embodiments of the present invention, it is to be understood that the invention is not restricted to these examples. The semiconductive material employed can be of conductivity types opposite those shown, *n*-type can be substituted for *p*-type and vice versa, and the bias reversed for negative resistance operation. Barriers formed between semiconductive materials of opposite conductivity type, or between semiconductive materials and metals can be employed as the injecting means and the collecting means. The transit region in which transit time is critical to the attainment of negative resistance can be made up of a diffusion region and a drift region which includes the distance from an injector through a space charge region at a reverse biased barrier and may be either *n* or *p*-type material, it may be entirely a drift region in *n* or *p*-type material, or it may be an intrinsic region intermediate an injector and a collector.

What is claimed is:

1. An electrical translator exhibiting a negative resistance at a preassigned frequency, comprising a body of semiconductive material, two spaced zones in said body containing a predominance of mobile charge carriers of one type, a third zone in said body which is characteristically essentially free of mobile charge carriers of said one type, said third zone being contiguous with and separating said two zones, a separate electrical connection to each of said two zones, and a source of potential connected between said two zones and applying a voltage such that said one type of charge carrier has an average transit time through said third zone lying between one half and three halves the period of said frequency.

2. An electrical translator exhibiting a negative resistance to an alternating signal comprising a body of semiconductive material, two spaced zones in said body containing a predominance of mobile charge carriers of one type, a third zone in said body which is characteristically essentially free of mobile charge carriers of said one type, said third zone being contiguous with and separating said two zones, a separate electrical connection to each of said two zones, a source of direct current potential connected between said two zones, and means for applying an alternating signal to said body, the separation of said two zones across said third zone, the magnitude of the applied potential and the frequency of said signal being so correlated that said one type of charge carrier has an average transit time through said third zone lying between one half and three halves the signal period.

3. A transit time negative resistance comprising a semiconductive diode, means for applying a potential across said diode, a zone in the semiconductive body of said diode including a region wherein the major portion of the potential appears, means for injecting charge carriers into said zone, and means for applying a signal to said diode having a period lying between two-thirds and twice the transit time of charge carriers from said injecting means through said zone.

4. An electrical translator exhibiting a negative resistance at a certain frequency comprising a semiconductive diode, a source of electrical potential across said diode, a zone in the semiconductive body containing two substantially equally spaced electrically equipotential surfaces between which the major portion of the potential appears, means for suppressing the flow of one type of charge carrier in said zone, means for producing a flow of charge carriers in said zone of a type opposite that suppressed therein, and means for producing a progressive increase in drift velocity in the direction of charge carrier flow, the average transit time of said opposite type charge carriers between said equipotential surfaces being between one half and three halves the period of said frequency.

5. An electrical translator exhibiting negative resistance to an alternating signal comprising a semiconductive body having at least two contiguous zones of different conductivity type and a *p-n* junction between said zones, an injector of minority charge carriers associated with one of said zones, an electrode connected to a second of said zones, a voltage bias between said injector and said electrode biasing said junction in its high resistance direction, and means to apply an alternating signal to said injector, the electrical and physical dimensions of the translator as a whole being such that the effective charge carrier transit time between said injector and said junction falls between one half and three halves the period of said signal.

6. An electrical translating element having a negative resistance characteristic to high frequency signals comprising a semiconductive body, an injector of minority charge carriers associated with a portion of said body, an electrode on said body, a barrier spaced from said injector and intermediate said injector and said electrode, means for biasing said barrier in the high resistance direction to establish a field extending from said barrier towards said injector, and means for applying a signal between said injector and said electrode, the period of the signal being so related to the transit time of the charge carriers from the injector to the barrier that the resulting effective current in said element is shifted in phase between 90 degrees and 270 degrees with respect to the signal voltage.

7. An electrical translating element having a negative resistance characteristic to high frequency signals comprising a semiconductive body having a pair of spaced zones containing a predominance of mobile charge carriers of one type, a region in said body which is characteristically essentially free of mobile charge carriers of said one type, said region being contiguous with and separating said two zones to form at its interface with each a rectifying junction, a first and second electrode so spaced on said body that at least two rectifying junctions are present in the portion of the body between them, means to bias one of said junctions in the forward direction and another of said junctions in the reverse direction and thereby establish a field extending from said reverse biased junction towards said forward biased junction, and means for applying an alternating voltage signal across said first and second electrodes, the average transit time across said region of charge carriers of said one type injected due to said signal at said forward biased junction being so related to the signal period that the effective current resulting from the flow of signal charge is between 90 and 270 degrees out of phase with the signal voltage and the integrated product of the signal voltage and signal current is negative.

8. A transit time negative resistance comprising a body of semiconductive material having a first zone containing a predominance of mobile charge carriers of one type, a second zone which is characteristically essentially free of mobile charge carriers of said one type and a barrier intermediate said first and second zones, a source of charge carriers of said one type associated with said second zone, means biasing the barrier between said first and second zones in its high resistance direction, and means to apply an alternating signal to said charge carrier source, the electrical and physical dimensions of the semiconductive body being such that the effective transit time of said one type of charge carriers between said source and said barriers falls between one-half and three halves the period of said signal.

9. An electrical translator exhibiting negative resistance to an alternating signal comprising a body of semiconductive material having two zones containing a predominance of mobile charge carriers of one type, a region intermediate and contiguous with said two zones of a material which is characteristically essentially free of mobile charge carriers of said one type, a barrier layer between each of said two zones and said intermediate region, an electrode connected to each zone, a biasing means connected to said electrodes to bias one of said barriers in its low resistance direction to inject into said intermediate region charge carriers of said one type, said biasing means also biasing another of said barriers in its high resistance direction, a portion of said intermediate region having a low potential gradient and another portion having a high potential gradient whereby the flow of said injected charge carriers through said portions of low potential gradient is slow relative to the rate of flow through said portion of high potential gradient, and means to apply an alternating signal voltage across said electrodes, the effective transit time of said charge carriers between said electrodes and the signal period being correlated to effect a phase shift between the signal voltage and signal current of between 90 and 270 degrees.

10. A diode oscillator comprising a body of electronic semiconductive material having a first zone containing a predominance of mobile charge carriers of one type, a second zone which is characteristically essentially free of mobile charge carriers of said one type, and a barrier between said zones, an injector of minority charge carriers of said one type associated with said second zone, an electrode connected to said first zone, a voltage bias between said injector and said electrode biasing said junction in its high resistance direction, and an impedance connected to said body, the reactive component of said impedance being in series resonance with the reactance of said body at a frequency the period of which falls between two-thirds and twice the effective transit time of said one type of charge carrier between said injector and said carrier.

11. A semiconductive diode oscillator comprising a semiconductive body, an injector of one type of charge carriers engaging said body, an electrode on said body, a barrier intermediate said injector and said electrode, said one type of charge carriers being of a type of which the region between said injector and said barrier is characteristically essentially free, means for biasing said barrier in the high resistance direction and thereby establish a field extending from said barrier towards said injector, and an inductance connected between said injector and said electrode, said inductance being of a magnitude which resonates with the capacitance of said body at a frequency at which the transit time of said one type of charge carriers flowing from said injector to said barrier is so related to the period of the resonant frequency that the effective current resulting from the flow of charge is between 90 and 270 degrees out of phase with the resonance voltage signal and the integrated product of a signal voltage of resonance frequency and the signal current is negative.

12. An oscillator comprising a body of semiconductive material having three successive zones of alternately opposite conductivity types, means for making electrical connection to the first and third zones, an impedance shunting said body and resonating therewith at a frequency at which the real part of the impedance of said body is negative, and a biasing source connected across said body.

13. A two-electrode oscillator as defined in claim 11 in which the first and third zones comprise material of relatively high impurity content and the intermediate zone material of relatively low impurity content.

14. An electrical translator exhibiting a negative resistance to an alternating signal comprising a body of semiconductive material, a region in said body which is substantially void of the charge carriers responsible for conduction through said body in the absence of an applied potential, a source of potential applied across said region, an injector of conduction charge carriers engaging said region, means for applying an alternating signal across said region to inject charge carriers into said region, the period of said signal and the transit time of charge carriers from said injector through said region being so correlated that the effective signal current is between 90 degrees and 270 degrees out of phase with the signal voltage.

15. An electrical translator exhibiting a negative resistance to an alternating signal comprising a semiconductive body, a first and second electrode in spaced relationship on said body, a source of potential connected between said electrodes, said first electrode constituting means for injecting charge carriers of a type not normally present in said body in appreciable amounts into said body, said second electrode forming a rectifying barrier with said body, and means for applying an alternating signal across said electrodes, the biasing potential, the spacing of said first and second electrodes and the signal frequency being so correlated that the charge carriers injected into said body from said first electrode have an average transit time to said second electrode lying between one half and three halves the signal period.

16. A transit time negative resistance comprising a semiconductive body, a first zone of one conductivity type separating and contiguous with two zones of opposite conductivity type in said body, a barrier between said first zone and each of said two zones, a source of potential applied to said two zones, means restricting the major portion of the applied potential to a region across the reverse biased barrier between said first zone and one of said two zones, and means for applying an alternating signal to said body having a period of between two-thirds and twice the average transit time of the charge carriers predominating in said two zones through said first zone.

17. A transit time negative resistance comprising a semiconductive body, a $p$-type zone separating and contiguous with two $n$-type zones in said body, a barrier between said $p$-type zone and each of said $n$-type zones, means restricting the major portion of the applied potential to a region across the reverse biased barrier between said $p$-type zone and one of said $n$-type zones, and means for applying an alternating signal to said body having a period of between two-thirds and twice the average transit time of the charge carriers predominating in said $n$-type zones, through said $p$-type zone.

18. A transit time negative resistance comprising a semiconductive body, a first zone in said body having a relatively low predominance of one type of charge carriers, a second and third zone in said body each contiguous with said first zone and having a substantially uniform separation from each other having a relatively high predominance of charge carriers of the type opposite those predominating in said first zone, a source of potential applied to said two zones, and means for applying to said body an alternating signal having a period of between two-thirds and twice the average transit time of the charge carriers predominating in said two zones through said first zone.

19. A transit time negative resistance comprising a semiconductive body, a first zone of one conductivity type separating and contiguous with two zones of opposite conductivity type in said body, a source of potential applied to said two zones, means restricting a major portion of the applied potential within said first zone, means limiting the space charge in said first zone due to the majority carriers of said zone to low values relative to the space charge of moving charge carriers in said zone, and means for applying an alternating signal to said body having a period of between two-thirds and twice the average transit time of the charge carriers predominating in said two zones through said first zone.

20. A transit time negative resistance comprising a semiconductive body, a $\nu$-type zone separating and contiguous with two highly doped $p$-type zones in said body, a source of potential applied to said two zones, means restricting a major portion of the applied potential within said $\nu$-type zone, means limiting the space charge in the $\nu$-type zone due to electrons to low values relative to the space charge of moving holes, and means for applying an alternating signal to said body having a period of between two-thirds and twice the average transit time of the holes predominating in said two zones through said $\nu$-type zone.

21. A transit time negative resistance comprising a body of silicon, an $n$-type zone in said body having a resistivity of the order of 4000 ohm-centimeters and a thickness of the order of 0.02 centimeter, a second and third zone of strongly $p$-type material in said body each contiguous with said first zone and substantially uniformly separated from each other across said $n$-type zone, a source of potential applying about 50 volts across said $n$-type zone, and means for applying an alternating signal of about 16 megacycles to said body.

22. A transit time negative resistance comprising a semiconductive body, a first zone in said body having a relatively low predominance of one type of charge carrier, a second zone in said body contiguous with said first zone over a relatively large area and having a relatively high predominance of charge carrier of the type opposite those predominating in said first zone, an electrode on said body spaced from said second zone, a barrier having a small area of contact with said first zone relative to the contact area of said second zone intermediate said electrode and said second zone, a source of potential connected between said second zone and said electrode and polarized to draw majority charge carriers from said second zone to said barrier, and means for applying an alternating signal to said body having a period of between two-thirds and twice the average transit time of the charge carriers predominating in said second zone through said first zone.

23. A transit time negative resistance comprising a semiconductive body, a first zone in said body having a relatively low predominance of one type of charge carrier, a second zone in said body contiguous with said first zone over a relatively large area, a third zone in said body contiguous with said first zone over a relatively small area, said second and third zones having a relatively high predominance of charge carriers of the type opposite those predominating in said first zone, a source of potential connected between said second and third zones and polarized to draw majority charge carriers from said second zone to said third zone and means for applying an alternating signal to said body having a period of between two-thirds and twice the average transit time of the charge carriers predominating in said two zones through said first zone.

24. A transit time negative resistance comprising a semiconductive body, a first zone in said body having a hemispherical shell form and a relatively low predominance of one type of charge carrier, a second and third zone in said body contiguous with the outer and inner surfaces respectively of the hemisphere of said first zone and each containing a predominance of the opposite type charge carrier, a source of potential connected between said second and third zones and polarized to draw majority charge carriers from said second zone to said third zone, and means for applying an alternating signal to said body having a period of between two-thirds and twice the average transit time of the charge carriers predominating in said two zones through said first zone.

25. A transit time negative resistance comprising a semiconductive body, a pair of spaced zones in said body containing a predominance of mobile charge carriers of one type, a region intermediate said zones and contiguous therewith which is characteristically essentially free of mobile charge carriers of said one type, a barrier between said zones and said region, a source of potential applied to said zones and across said region, said source biasing one of said barriers in the forward direction of conduction to inject charge carriers of said one type into said region, means increasing the electric field in said region in the direction of flow of said one type of injected charge carriers to values at least equal to that which reduces the mobility of said carriers by a factor of two, and means for applying an alternating signal to said body having a period of between two-thirds and twice the average transit time of said charge carriers through said region.

26. A transit time negative resistance comprising a semiconductive body, a first zone in said body having a relatively low predominance of one type of charge carrier, a second and third zone in said body each contiguous with said first zone and substantially equally spaced from each other having a relatively high predominance of charge carriers of the type opposite those predominating in said first zone, means for producing a progressive increase in drift velocity in said first zone in the direction of carrier flow, a source of potential applied to said two zones, and means for applying an alternating signal to said body having a period of between two-thirds and twice the average transit time of the charge carriers predominating in said two zones through said first zone.

27. An electrical signal translator exhibiting a negative resistance comprising a semiconductive body, a pair of spaced electrodes to said body, a source of electrical potential connected to said electrodes across said body, a region in said body defined by two substantially uniformly spaced electrical equipotential surfaces between which the major portion of said potential appears, means for suppressing the flow of one type of charge carrier in said region, means for producing a flow of charge carriers of the type opposite those which are suppressed into said region, and means for producing a progressive increase in the drift velocity of said opposite type charge carriers from said flow producing means through said region, the average transit time for said opposite type charge carriers across said region being between one half and three halves the period of a preassigned frequency.

28. An electrical signal translator exhibiting negative resistance at a certain frequency comprising a semi-conductive body, a pair of spaced zones in said body containing a predominance of mobile charge carriers of one type, a region in said body intermediate said zones and contiguous with each which is characteristically essentially free of mobile charge carriers of said one type, a source of electrical potential connected to said zones, a space charge region extending into said intermediate region defined by two substantially equally spaced electrical equipotential surfaces between which the major portion of said potential appears, means for suppressing the flow of charge carriers of the type opposite said one type in said intermediate region, means for injecting charge carriers of said one type into said region, means for producing a progressive increase in carrier drift velocity from said injecting means across said intermediate region, the average transit time for carriers across said intermediate region being between one half and three halves the period of said frequency.

29. A transit time negative resistance comprising a semiconductive body, a zone of one conductivity type in said body, two zones of the conductivity type opposite said first zone contiguous with said first zone, a source of potential applied to said two zones, means for injecting charge carriers of the type predominating in said two zones into said first zone comprising a forward biased junction intermediate said first zone and one of said two zones, a region in said first zone adjacent said injector means wherein charge carrier flow occurs by a diffusion process, a region in said first zone contiguous with said diffusion region and extending to the reverse bias junction between said first zone and the other of said two zones wherein carrier flow occurs by a drift process, the average transit time for carriers across said first zone being between one half and three halves the period of said frequency.

30. A semiconductive diode, negative resistance comprising a semiconductive body, means injecting charge carriers into said body actuated by a voltage signal, means delaying the flow of injected charge carriers to produce a phase shift between those carriers and said voltage signal, and means causing a current at the terminals of said diode corresponding to the flow charge carriers and shifted between 90 and 270 degrees in phase with respect to said voltage signal.

31. An electrical impedance comprising a body of semiconductive material, means for establishing a space charge region in said body, means for injecting electrical carriers into said region, and means for causing said carriers to traverse a portion of said body from said injecting means through said region in a time substantially equal to between two-thirds and twice the period of a certain frequency.

32. An electrical impedance comprising a body of semiconductive material having therein a first zone weakly of one conductivity type and having a second zone strongly of the opposite conductivity type forming a barrier with said first zone, means biasing said barrier in the reverse direction thereby to establish a space charge region in said first zone, means for injecting electrical carriers into said first zone, and means for establishing across said region a signal voltage having a period between substantially one half and three halves the transit time of carriers across said first zone.

33. An electrical impedance comprising a body of semiconductive material having a barrier therein, a source of charge carriers of the type of which said material is characteristically essentially free, said source engaging said body at a point spaced from said barrier, a path of charge carrier flow in said body from said source to said barrier having a conductivity which decreases in the direction of said barrier, a pair of terminals on said body on opposite sides of said source and barrier, and means for applying an alternating signal to said body having a period of between two-thirds and twice the average transit time of charge carriers of said type from said source to said barrier.

34. An electrical impedance comprising a body of semiconductive material having three successive zones of alternately opposite conductivity types, an electrode to each of the zones of like conductivity type, means biasing one junction in said body in the forward direction and the other junction in the reverse direction, the space charge region encompassing the reverse biased junction extending only partially across the one zone of opposite conductivity type, and means for establishing a negative resistance between said terminals, said means comprising a source biasing said barrier in the reverse direction and means applying a high frequency signal across said barrier.

35. An electrical impedance comprising a body of semiconductive material having three successive zones of alternately opposite conductivity types, an electrode to each of the zones of like conductivity type, means biasing one junction in said body in the forward direction and the other junction in the reverse direction, the space charge region encompassing the reverse biased junction extending only partially across the one zone of opposite conductivity type, a region in said one zone wherein a gradient in the predominance of the conductivity type determining impurity decreases exponentially in the direction of the reverse biased junction, and means for establishing a negative resistance between said terminals, said means comprising a source biasing said barrier in the reverse direction and means applying a high frequency signal across said barrier.

36. An electrical oscillator comprising a body of semiconductive material having a first and third zone of one conductivity type, a second zone of opposite conductivity type contiguous with and separating said first and third zones, means biasing the barrier between said second and third zones in the reverse direction, and an inductance connected across said semiconductive body, said inductance resonating with the capacitive reactance of said body at a frequency substantially equal to $$(25\pi^2/8)D/L^2$$

where $D$ is the diffusion constant of minority charge carriers in the material of said second zone, and $L$ is the distance from the barrier between said first and second zones to the edge of the space charge region surrounding said reverse biased barrier.

37. An electrical impedance comprising a body of semiconductive material having a first and third zone of one conductivity type, a second zone of the opposite conductivity type contiguous with and separating said first and third zones, means biasing the barrier between said second and third zones in the reverse direction and causing the space charge region surrounding said barrier to extend only partially across said second zone, means applying a signal across said body having an angular frequency substantially equal to $$(25\pi^2/8) D/L^2$$

where D is the diffusion constant for minority charge carriers in the material of said second zone, and L is the distance from the barrier between said first and second zones to the edge of the space charge region in said second zone.

38. A transit time negative resistance comprising a semiconductive body, a zone in said body containing a predominance of mobile charge carriers of one type, a region in said body contiguous with said zone over a relatively large area and of a material which is characteristically essentially free of mobile charge carriers of said one type, an electrode on said body spaced from said zone, a barrier having an area of contact with said region which is small relative to the contact area of said region with said zone, said barrier being intermediate said electrode and said zone, a source of potential connected between said zone and said electrode and polarized to draw charge carriers of said one type from said zone to said barrier across said region and means for applying an alternating signal to said body having a period of between two-thirds and twice the average transit time of charge carriers of said one type across said region.

39. A transit time negative resistance as recited in claim 38 wherein the material of said region is of intrinsic conductivity.

40. A signal translating device comprising a body of semiconductive material containing a pair of spaced concentric zones of a material containing a predominance of mobile charge carriers of one type, a region intermediate and contiguous with said zones of a material which is characteristically essentially free of mobile charge carriers of said one type, a source of potential connected between said zones and polarized to draw charge carriers of said one type from the outermost of said zones to the innermost of said zones across said region, and means for applying an alternating signal to said body having a period of between two-thirds and twice the average transit time of said one type of charge carrier through said region.

References Cited in the file of this patent

UNITED STATES PATENTS

| | | |
|---|---|---|
| 2,469,569 | Ohl | May 10, 1949 |
| 2,556,296 | Rack | June 12, 1951 |
| 2,570,978 | Pfann | Oct. 9, 1951 |
| 2,577,803 | Pfann | Dec. 11, 1951 |
| 2,585,078 | Barney | Feb. 12, 1952 |
| 2,586,597 | Barden | Feb. 19, 1952 |
| 2,602,211 | Scaff | July 8, 1952 |
| 2,651,831 | Bond | Sept. 15, 1953 |

FOREIGN PATENTS

| | | |
|---|---|---|
| 236,648 | Great Britain | July 9, 1925 |